(12) United States Patent
Shedd et al.

(10) Patent No.: US 9,891,002 B2
(45) Date of Patent: Feb. 13, 2018

(54) HEAT EXCHANGER WITH INTERCONNECTED FLUID TRANSFER MEMBERS

(71) Applicant: EBULLIENT, LLC, Madison, WI (US)

(72) Inventors: Timothy A. Shedd, Middleton, WI (US); Brian B. Liu, New Berlin, WI (US); Kevin M. Ripley, Pulaski, WI (US); Tony P. Taylor, Pelican Lake, WI (US)

( * ) Notice: Subject to any disclaimer, the term of this patent is extended or adjusted under 35 U.S.C. 154(b) by 157 days.

(21) Appl. No.: 14/833,092

(22) Filed: Aug. 22, 2015

(65) Prior Publication Data

US 2016/0116222 A1    Apr. 28, 2016

Related U.S. Application Data

(60) Provisional application No. 62/069,031, filed on Oct. 27, 2014, provisional application No. 62/072,421, (Continued)

(51) Int. Cl.
*F28D 7/02* (2006.01)
*F28D 9/02* (2006.01)
(Continued)

(52) U.S. Cl.
CPC .............. *F28D 1/0233* (2013.01); *F28F 1/36* (2013.01); *F28F 7/00* (2013.01); *F28F 7/02* (2013.01);
(Continued)

(58) Field of Classification Search
CPC .... G06F 1/206; G06F 1/20; F28F 1/42; F28F 1/422; F28F 1/424; F28F 7/02; F28F 3/12;
(Continued)

(56) References Cited

U.S. PATENT DOCUMENTS

| 2,021,117 A | 11/1935 | Lucke |
| 3,295,599 A * | 1/1967 | Okamoto ................. F28F 1/12 165/184 |

(Continued)

FOREIGN PATENT DOCUMENTS

| GB | 980413 | 1/1965 |
| JP | 2008232548 | 2/2008 |

(Continued)

OTHER PUBLICATIONS

HFC-245fa Product Stewardship Summary (Honeywell); Dec. 2007; retrieved from the Internet on Jan. 25, 2016; URL:<https://www51.honeywell.com/sm/common/documents/Public-Ris-Summary-HFC-245fa.pdf>.

(Continued)

*Primary Examiner* — Grant Moubry
*Assistant Examiner* — Jason Thompson
(74) *Attorney, Agent, or Firm* — Nicholas J. Boyarski

(57) ABSTRACT

A heat exchanger can include a stacked array of interconnected fluid transfer members. The stacked array of interconnected fluid transfer members can include a first fluid transfer member, a second fluid transfer member, a third fluid transfer member, and a fourth fluid transfer member. The first fluid transfer member can include a liquid passageway extending lengthwise though the first fluid transfer member and a set of helical fins extending outwardly from an outer surface of the first fluid transfer member and rotating along a length of the first fluid transfer member. The stacked array of interconnected fluid transfer members can form a jointless structure.

15 Claims, 17 Drawing Sheets

Related U.S. Application Data filed on Oct. 29, 2014, provisional application No. 62/202,164, filed on Aug. 6, 2015.

(51) Int. Cl.

| | | |
|---|---|---|
| *F28F 1/36* | (2006.01) | |
| *F28D 1/02* | (2006.01) | |
| *F28F 13/18* | (2006.01) | |
| *F28F 7/00* | (2006.01) | |
| *F28F 7/02* | (2006.01) | |
| *F28F 9/02* | (2006.01) | |
| *F28F 21/06* | (2006.01) | |
| *G06F 1/20* | (2006.01) | |
| *F28D 9/00* | (2006.01) | |

(52) U.S. Cl.
CPC .......... *F28F 9/0221* (2013.01); *F28F 9/0263* (2013.01); *F28F 13/185* (2013.01); *F28F 21/06* (2013.01); *G06F 1/20* (2013.01); *G06F 1/206* (2013.01); *F28D 9/0093* (2013.01); *F28F 2265/26* (2013.01); *Y02B 60/1275* (2013.01)

(58) Field of Classification Search
CPC ........ F28F 9/0263; F28F 9/0282; F28F 1/006; F28F 1/02; F28F 1/022; F28F 1/025; F28F 1/10; F28F 1/34; F28F 1/36; F28F 9/0221; F28F 9/027; F28F 9/026; F28F 9/0275; F28F 13/125; F28F 13/12; F28F 13/185; F28D 17/02; F28D 7/02; F28D 7/163; F28D 7/1653; F28D 7/1684; F28D 1/053; F28D 1/05316; F28D 1/05333; F28D 1/0535; F28D 1/05366; F28D 1/05383; F28D 1/0233; F28D 2001/026; F28D 2001/0266
USPC ................ 165/179, 184, 139, 148, 164, 165
See application file for complete search history.

(56) References Cited

U.S. PATENT DOCUMENTS

| | | | |
|---|---|---|---|
| 3,406,244 A | 10/1968 | Sevgin | |
| 4,065,264 A | 12/1977 | Lewin | |
| 4,163,473 A * | 8/1979 | Engelberts | .............. B21C 37/22 165/157 |
| 4,347,896 A | 9/1982 | Rosman et al. | |
| 4,621,592 A * | 11/1986 | McInerney | ........... F22B 37/101 122/169 |
| 4,893,672 A | 1/1990 | Bader | |
| 5,400,854 A * | 3/1995 | Iio | ......................... F28D 9/0043 165/157 |
| 5,458,187 A | 10/1995 | Davis | |
| 5,761,045 A | 6/1998 | Olson et al. | |
| 6,098,704 A * | 8/2000 | Tsuchiya | ................. B21C 23/10 165/154 |
| 6,222,264 B1 | 4/2001 | Liao et al. | |
| 6,230,791 B1 | 5/2001 | Dine et al. | |
| 6,662,858 B2 | 12/2003 | Wang | |
| 6,866,092 B1 | 3/2005 | Molivadas | |
| 6,981,542 B2 | 1/2006 | Lopatinsky et al. | |
| 7,093,649 B2 | 8/2006 | Dawson | |
| 7,484,552 B2 | 2/2009 | Pfahnl | |
| 7,506,680 B1 | 3/2009 | Castillo | |
| 7,597,136 B2 | 10/2009 | Kite et al. | |
| 8,184,436 B2 | 5/2012 | Campbell et al. | |
| 8,820,395 B2 | 9/2014 | Yatskov | |
| 8,851,154 B2 | 10/2014 | Cheng et al. | |
| 2002/0080584 A1 | 6/2002 | Prasher et al. | |
| 2002/0125001 A1* | 9/2002 | Kelly | ........................ F28F 7/02 165/165 |
| 2002/0152761 A1 | 10/2002 | Patel et al. | |
| 2003/0173720 A1* | 9/2003 | Musso | ................ C04B 38/0006 264/635 |
| 2003/0205364 A1 | 11/2003 | Sauciuc et al. | |
| 2004/0007349 A1* | 1/2004 | Youn | ...................... F25B 39/04 165/115 |
| 2004/0036161 A1 | 2/2004 | Williams et al. | |
| 2004/0221604 A1 | 11/2004 | Ota et al. | |
| 2005/0068724 A1 | 3/2005 | Pokharna et al. | |
| 2005/0128705 A1 | 6/2005 | Chu et al. | |
| 2005/0185378 A1 | 8/2005 | Tilton et al. | |
| 2005/0199372 A1 | 9/2005 | Frazer et al. | |
| 2006/0002080 A1 | 1/2006 | Leija et al. | |
| 2006/0113066 A1 | 6/2006 | Mongia et al. | |
| 2006/0187638 A1 | 8/2006 | Vinson et al. | |
| 2006/0250773 A1 | 11/2006 | Campbell et al. | |
| 2006/0258209 A1 | 11/2006 | Hall | |
| 2006/0289987 A1 | 12/2006 | Chiu | |
| 2007/0251671 A1* | 11/2007 | Barnes | .................. F28D 1/0333 165/83 |
| 2007/0256810 A1 | 11/2007 | Stefano et al. | |
| 2007/0289317 A1 | 12/2007 | Minor et al. | |
| 2007/0295480 A1 | 12/2007 | Campbell et al. | |
| 2008/0041574 A1 | 2/2008 | Arik et al. | |
| 2008/0078202 A1 | 4/2008 | Luo | |
| 2008/0170368 A1 | 7/2008 | Chen et al. | |
| 2008/0295535 A1 | 12/2008 | Robinet et al. | |
| 2009/0020266 A1 | 1/2009 | Weber et al. | |
| 2009/0032937 A1 | 2/2009 | Mann et al. | |
| 2009/0034184 A1 | 2/2009 | Atallah | |
| 2009/0242184 A1 | 10/2009 | Mishima et al. | |
| 2009/0272144 A1 | 11/2009 | Lin | |
| 2009/0308582 A1* | 12/2009 | Nagurny | ................ B21D 53/02 165/167 |
| 2010/0101765 A1 | 4/2010 | Campbell et al. | |
| 2010/0252238 A1 | 10/2010 | Batty et al. | |
| 2010/0254758 A1 | 10/2010 | Campbell et al. | |
| 2011/0085301 A1 | 4/2011 | Dunn | |
| 2011/0277491 A1 | 11/2011 | Wu et al. | |
| 2011/0290448 A1 | 12/2011 | Campbell et al. | |
| 2011/0313576 A1 | 12/2011 | Nicewonger | |
| 2012/0020022 A1 | 1/2012 | Peterson et al. | |
| 2012/0026745 A1 | 2/2012 | Cheng et al. | |
| 2012/0267077 A1 | 10/2012 | Dede | |
| 2013/0027884 A1 | 1/2013 | Campbell et al. | |
| 2013/0077247 A1 | 3/2013 | Campbell et al. | |
| 2013/0138253 A1 | 5/2013 | Chainer et al. | |
| 2013/0139998 A1 | 6/2013 | Hayashi et al. | |
| 2013/0277022 A1 | 10/2013 | Neal et al. | |
| 2013/0340995 A1 | 12/2013 | David et al. | |
| 2014/0014493 A1 | 1/2014 | Ryan | |
| 2014/0076523 A1 | 3/2014 | Pritzker et al. | |
| 2014/0124163 A1 | 5/2014 | Campbell et al. | |
| 2014/0158324 A1* | 6/2014 | Tochiyama | ........... H01L 23/473 165/67 |
| 2014/0190665 A1 | 7/2014 | Joshi et al. | |
| 2014/0307389 A1 | 10/2014 | Arvelo et al. | |

FOREIGN PATENT DOCUMENTS

| | | | |
|---|---|---|---|
| WO | 2005099888 A1 | 10/2005 | |
| WO | WO 2011115883 A2 * | 9/2011 | ............. B22F 7/002 |

OTHER PUBLICATIONS

Honeywell Refrigerants: Genetron 245fa; Dec. 22, 2013; retrieved from the Internet on Jan. 25, 2016; URL <https://web.archive.org/web/20131222085005/http:www.honeywell-refrigerants.com/americas/product/genetron-245fa>.
International Search Report and Written Opinion in PCT/US15/56791 dated Feb. 3, 2016.

\* cited by examiner

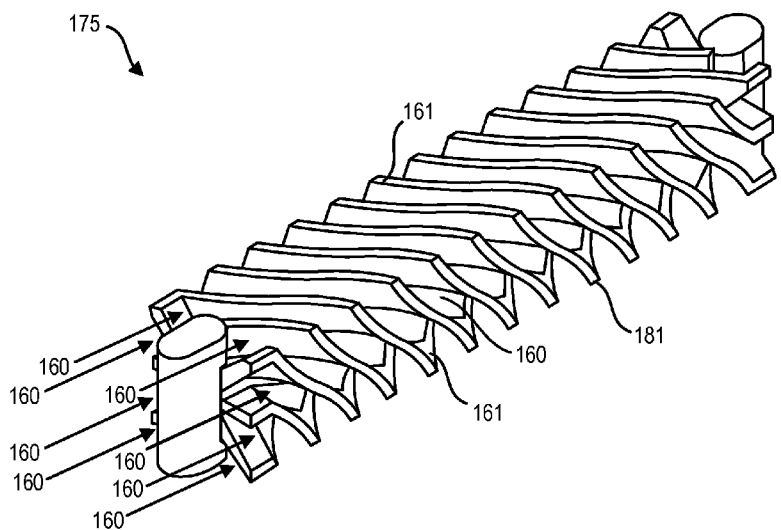
FIG. 27
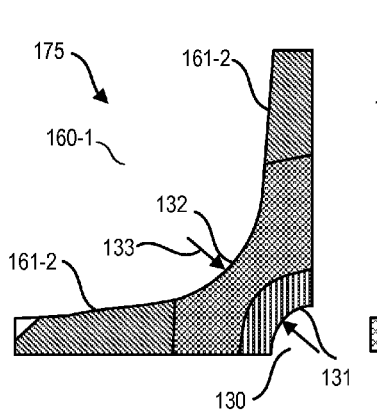 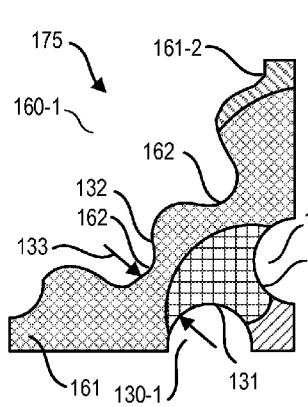 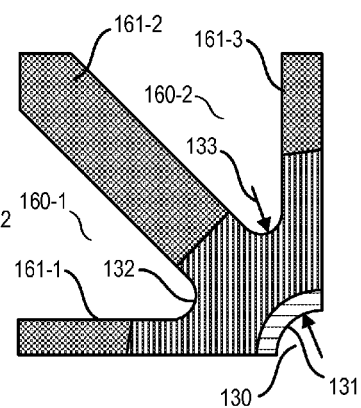
FIG. 28A    FIG. 28B    FIG. 28C

HEAT EXCHANGER WITH INTERCONNECTED FLUID TRANSFER MEMBERS

CROSS-REFERENCE TO RELATED APPLICATIONS

This application claims the benefit of U.S. Provisional Patent Application No. 62/069,301 filed Oct. 27, 2014; U.S. Provisional Patent Application No. 62/072,421 filed Oct. 29, 2014; and U.S. Provisional Patent Application No. 62/202,164 filed Aug. 6, 2015, each of which is hereby incorporated by reference in its entirety as if fully set forth in this description.

FIELD

This disclosure relates to methods and apparatuses for transferring heat from a first fluid to a second fluid. More specifically, this disclosure relates to heat exchangers for transferring heat from a first fluid to a second fluid and methods for operating the heat exchangers.

BACKGROUND

Heat exchangers are used in a wide variety of products and processes to efficiently transfer heat from a higher temperature fluid to a lower temperature fluid, often without mixing the fluids. Heat exchangers are often simple mechanical devices with no moving parts. Heat exchangers are employed in a wide variety of industrial processes, including refining and manufacturing processes, and are present in many products, including vehicles, computers, power electronics, medical equipment, and weapons systems.

Heat exchangers can be categorized based on flow arrangement and construction type. Common flow arrangements include parallel-flow, counter-flow, and cross-flow. In a parallel-flow arrangement, hot and cold fluids enter at the same end of the heat exchanger and flow in the same direction. In a counter-flow arrangement, hot and cold fluids enter at opposite ends of the heat exchanger and flow in opposite directions. In a cross-flow arrangement, hot and cold fluids flow perpendicular to each other through the heat exchanger. Common construction types include concentric tube, shell-and-tube, fin-tube, rotating wheel, and plate-fin.

Heat exchanger can be designed to transfer heat from liquids to liquids, gases to gases, or liquids to gases. In liquid-to-gas heat exchangers for computer cooling, the liquid is often water and the gas is often air. These liquid-to-gas heat exchangers suffer poor gas-side performance due to low thermal conductivity and low thermal capacity of the air flowing through the heat exchangers.

SUMMARY

The heat exchangers disclosed herein can be used in a wide variety of products and processes to efficiently transfer heat from a higher temperature fluid to a lower temperature fluid. In some examples, a heat exchanger can include a stacked array of interconnected fluid transfer members having a first fluid transfer member, a second fluid transfer member, a third fluid transfer member, and a fourth fluid transfer member. The first fluid transfer member can include a first liquid passageway extending lengthwise though the first fluid transfer member and a first set of four helical fins extending outwardly from an outer surface of the first fluid transfer member and rotating counterclockwise along a length of the first fluid transfer member. The second fluid transfer member can include a second liquid passageway extending lengthwise though the second fluid transfer member and a second set of four helical fins extending outwardly from an outer surface of the second fluid transfer member and rotating clockwise along a length of the second fluid transfer member. The third fluid transfer member can include a third liquid passageway extending lengthwise though the third fluid transfer member and a third set of four helical fins extending outwardly from an outer surface of the third fluid transfer member and rotating clockwise along a length of the third fluid transfer member. The fourth fluid transfer member can include a fourth liquid passageway extending lengthwise though the fourth fluid transfer member and a fourth set of four helical fins extending outwardly from an outer surface of the fourth fluid transfer member and rotating counterclockwise along a length of the fourth fluid transfer member. In the stack of interconnected fluid transfer members, the first fluid transfer member can be adjacent to and interconnected with the second fluid transfer member and the fourth fluid transfer member, the second fluid transfer member can be adjacent to and interconnected with the first fluid transfer member and the third fluid transfer member, the third fluid transfer member can be adjacent to and interconnected with the second fluid transfer member and the fourth fluid transfer member, and the fourth fluid transfer member can be adjacent to and interconnected with the first fluid transfer member and the third fluid transfer member.

The stacked array of interconnected fluid transfer members can form a jointless structure comprising a homogeneous material having a uniform thermal conductivity. The first set of helical fins can rotate around the first fluid transfer member 0.5-1.0, 0.75-1.5, 1.25-2, 1.5-3, 2-4, or more than 3 times along a length of the first fluid transfer member. The first set of helical fins can at least partially define four helical gas passageways wrapping around and along the outer surface of the first fluid transfer member.

The heat exchanger can include a first submanifold fluidly connecting an inlet of the first liquid passageway to an inlet of the second liquid passageway. The heat exchanger can include a dual tapered inlet manifold having a first tapered inlet manifold portion and a second tapered inlet manifold portion. The first tapered inlet manifold portion can be fluidly connected to a first end of the first submanifold, and the second tapered inlet manifold portion can be fluidly connected to a second end of the first submanifold.

Interconnection of the first fluid transfer member with the second fluid transfer member can include a first fin of the first set of four helical fins being interconnected to a second fin of the second set of four helical fins along a portion of the first fin. At a region of interconnection, the first fin and the second fin may have a jointless union formed by additive manufacturing.

The heat exchanger can include a set of four helical grooves in the outer surface of the fluid transfer member and rotating counterclockwise along a length of the first fluid transfer member. The heat exchanger can be made of a material having a thermal conductivity less than 10, 5, 2, or 0.5 W/m-K to limit axial conduction. The heat exchanger can have a thermal conductance greater than 2, 3, or 4 W/K. The first liquid passageway can have a diameter of about 0.02-0.04, 0.03-0.05, 0.04-0.06, 0.05-0.07, or 0.06-0.08 inches. The heat exchanger can have a density less than about 1.4, 1.3, or 1.2 grams per cubic centimeter._

In some examples, a heat exchanger can include an inlet manifold having a liquid inlet configured to receive a liquid, a first inlet manifold portion fluidly connected to the liquid inlet, and a second inlet manifold portion fluidly connected to the liquid inlet. The heat exchanger can include a first plurality of submanifolds fluidly connecting the first inlet manifold portion to the second inlet manifold portion. The heat exchanger can include a plurality of interconnected fluid transfer members forming a stacked array of interconnected fluid transfer members. Each fluid transfer member can have a liquid passageway extending lengthwise through an inner region of the fluid transfer member to form a plurality of liquid passageways. Each fluid transfer member can include at least four helical fins extending outward from and along an outer surface of the fluid transfer member. The heat exchanger can include an outlet manifold having a liquid outlet configured to discharge liquid, a first outlet manifold portion fluidly connected to the liquid outlet, and a second outlet manifold portion fluidly connected to the liquid outlet. The heat exchanger can include a second plurality of submanifolds fluidly connecting the first outlet manifold portion to the second outlet manifold portion. The plurality of liquid passageways can fluidly connect the first plurality of submanifolds to the second plurality of manifolds. The stacked array of interconnected fluid transfer members can form a jointless structure made of a homogeneous material having a uniform thermal conductivity, which can avoid thermal expansion issues.

The heat exchanger can include a plurality of helical gas passageways extending from a first side of the heat exchanger to a second side of the heat exchanger. A first helical gas passageway of the plurality of gas passageways can extend along and around a first outer surface of a first liquid passageway of the plurality of liquid passageways. The first helical gas passageway can be bounded at least in part by a first helical fin protruding from and extending along and around the first outer surface of the first liquid passageway and by a second helical fin protruding from and extending along and around the first outer surface of the first liquid passageway. Along at least a portion of the first helical gas passageway, the first helical gas passageway can also be bounded by a third helical fin protruding from and extending along and around a second outer surface of a second liquid passageway. A first tip of the first helical fin can mate with a third tip of the third helical fin along at least a portion of the first helical gas passageway. Along at least a portion of the first helical gas passageway, the first helical gas passageway can be bounded by a fourth helical fin protruding from and extending along and around the second outer surface of the second liquid passageway. A second tip of the second helical fin can mate with a fourth tip of the fourth helical fin along at least a portion of the first helical gas passageway.

The first helical passageway can rotate around the first liquid passageway 0.5-1.0, 0.75-1.5, 1.25-2, 1.5-3, 2-4, or more than 3 times along a length of the first liquid passageway. The heat exchanger can include a material having a thermal conductivity less than 10, 5, 2, or 0.5 W/m-K and a thermal conductance greater than 2, 3, or 4 W/K. The first liquid passageway can have a diameter of about 0.02-0.04, 0.03-0.05, 0.04-0.06, 0.05-0.07, or 0.06-0.08 inches. The heat exchanger can have a density less than about 1.4, 1.3, or 1.2 grams per cubic centimeter.

In some examples, a heat exchanger can include a stacked array of interconnected fluid transfer members having a first fluid transfer member, a second fluid transfer member, a third fluid transfer member, and a fourth fluid transfer member. The first fluid transfer member can include a first set of two or more liquid passageways extending lengthwise though the first fluid transfer member and a first set of helical fins extending outwardly from an outer surface of the first fluid transfer member and rotating clockwise along a length of the first fluid transfer member. The second fluid transfer member can include a second set of two or more liquid passageways extending lengthwise though the second fluid transfer member and a second set of helical fins extending outwardly from an outer surface of the second fluid transfer member and rotating counterclockwise along a length of the second fluid transfer member. The third fluid transfer member can include a third set of two or more liquid passageways extending lengthwise though the third fluid transfer member and a third set of helical fins extending outwardly from an outer surface of the third fluid transfer member and rotating counterclockwise along a length of the third fluid transfer member. The fourth fluid transfer member can include a fourth set of two or more liquid passageways extending lengthwise though the fourth fluid transfer member and a fourth set of helical fins extending outwardly from an outer surface of the fourth fluid transfer member and rotating clockwise along a length of the fourth fluid transfer member. In the stack of interconnected fluid transfer members, the first fluid transfer member can be adjacent to and interconnected with the second fluid transfer member and the fourth fluid transfer member, the second fluid transfer member can be adjacent to and interconnected with the first fluid transfer member and the third fluid transfer member, the third fluid transfer member can be adjacent to and interconnected with the second fluid transfer member and the fourth fluid transfer member, and the fourth fluid transfer member can be adjacent to and interconnected with the first fluid transfer member and the third fluid transfer member.

In some examples, a heat exchanger can include a first helical gas passageway extending from a first side of the heat exchanger to a second side of the heat exchanger. The first helical gas passageway can extend along, wrap around, and be in direct thermal communication with a first liquid passageway within the heat exchanger. The heat exchanger can include a second helical gas passageway extending from the first side of the heat exchanger to the second side of the heat exchanger. The second helical gas passageway can extend along, wrap around, and be in direct thermal communication with a second liquid passageway within the heat exchanger. Along a length of the first helical gas passageway, the first helical gas passageway can merge with and then separate from the second helical gas passageway within the heat exchanger.

The heat exchanger can include a third helical gas passageway extending from the first side of the heat exchanger to the second side of the heat exchanger. The third helical gas passageway can extend along, wrap around, and be in direct thermal communication with a third liquid passageway within the heat exchanger. Along the length of the first helical gas passageway, the first helical gas passageway can merge with the third helical gas passageway within the heat exchanger and then separate from the third helical gas passageway.

The heat exchanger can include a fourth helical gas passageway extending from the first side of the heat exchanger to the second side of the heat exchanger. The fourth helical gas passageway can extend along, wrap around, and be in direct thermal communication with a fourth liquid passageway within the heat exchanger. Along the length of the first helical gas passageway, the first helical gas passageway can merge with the fourth helical gas passageway within the heat exchanger and then separate from the fourth helical gas passageway.

The first helical gas passageway, the second helical gas passageway, the third helical gas passageway, and the fourth helical gas passageway can be part of a jointless, homogeneous structure. The homogeneous structure can have a uniform thermal conductivity to avoid thermal expansion issues. The heat exchanger can be made of a material having a thermal conductivity less than 10, 5, 2, or 0.5 W/m-K, such as a polymer. In some examples, one or more fans can be mounted to the first side of the heat exchanger to force gas through the helical gas passageways.

The heat exchanger can be a liquid-to-gas counter-flow heat exchanger. The first helical passageway can wrap around the first liquid passageway 0.5-1.0, 0.75-1.5, 1.25-2, 1.5-3, 2-4, or more than 3 times along a length of the first liquid passageway. The helical gas passageway can be configured to convey gas in a flow direction that is opposite from a flow direction of liquid in the liquid passageway. The first liquid passageway can have a diameter of about 0.02-0.04, 0.03-0.05, 0.04-0.06, 0.05-0.07, or 0.06-0.08 inches. The first liquid passageway can have a wall thickness of about 0.02-0.04, 0.03-0.05, 0.04-0.06, 0.05-0.07, or 0.06-0.08 inches.

In some examples, a heat exchanger can include a dual tapered inlet manifold having a liquid inlet configured to receive a liquid, a first tapered inlet manifold portion fluidly connected to the liquid inlet and tapering in cross-sectional area in a direction away from the liquid inlet, and a second tapered inlet manifold portion fluidly connected to the liquid inlet and tapering in a direction away from the liquid inlet. The heat exchanger can include a first plurality of submanifolds fluidly connecting the first tapered inlet manifold portion to the second tapered inlet manifold portion. The heat exchanger can include a plurality of liquid passageways fluidly connecting the first plurality of submanifolds to a second plurality of submanifolds. The heat exchanger can include a dual tapered outlet manifold having a liquid outlet configured to discharge liquid, a first tapered outlet manifold portion fluidly connected to the liquid outlet and tapering in cross-sectional area in a direction away from the liquid outlet, and a second tapered outlet manifold portion fluidly connected to the liquid outlet and tapering in a direction away from the liquid outlet. The second plurality of submanifolds can fluidly connect the first tapered outlet manifold portion to the second tapered outlet manifold portion. The heat exchanger can include a plurality of helical gas passageways extending from a first side of the heat exchanger to a second side of the heat exchanger. A first helical gas passageway of the plurality of helical gas passageways can extend along and around a first outer surface of a first liquid passageway of the plurality of liquid passageways.

The first helical gas passageway can be bounded at least in part by a first helical fin protruding from and extending along and around the first outer surface of the first liquid passageway and by a second helical fin protruding from and extending along and around the first outer surface of the first liquid passageway. Along at least a portion of the first helical gas passageway, the first helical gas passageway can be bounded by a third helical fin protruding from and extending along and around a second outer surface of a second liquid passageway, where a first tip of the first helical fin mates with a third tip of the third helical fin along at least a portion of the first helical gas passageway.

Along at least a portion of the first helical gas passageway, the first helical gas passageway can be bounded by a fourth helical fin protruding from and extending along and around the second outer surface of the second liquid passageway, where a second tip of the second helical fin mates with a fourth tip of the fourth helical fin along at least a portion of the first helical gas passageway.

Along at least a portion of the first helical gas passageway, the first helical gas passageway can be bounded by a fifth helical fin protruding from and extending along and around a third outer surface of a third liquid passageway, where the second tip of the second helical fin mates with a fifth tip of the fifth helical fin along at least a portion of the first helical gas passageway. Along at least a portion of the first helical gas passageway, the first helical gas passageway can be bounded by a sixth helical fin protruding from and extending along and around a fourth outer surface of a fourth liquid passageway, where the first tip of the first helical fin mates with a sixth tip of the sixth helical fin along at least a portion of the first helical gas passageway.

The first plurality of submanifolds can each include a first end fluidly connected to the first tapered inlet manifold portion, a second end fluidly connected to the second tapered inlet manifold portion, and a tapered section located between the first end and the second end. The tapered section can neck down to provide a cross-sectional area that is about 10-20, 15-30, or 20-50 percent of the cross-sectional area near the first and second ends of the submanifold.

The first helical gas passageway can be in direct thermal communication with the first liquid passageway and can rotate around the first liquid passageway 0.5-1.0, 0.75-1.5, 1.25-2, 1.5-3, 2-4, or more than 3 times over a length of the first liquid passageway. The first liquid passageway can be made of a material having a thermal conductivity less than 10, 5, 2, or 0.5 W/m-K. The first liquid passageway can have a diameter of about 0.02-0.04, 0.03-0.05, 0.04-0.06, 0.05-0.07, or 0.06-0.08 inches. The heat exchanger can have a density less than about 1.4, 1.3, or 1.2 grams per cubic centimeter and a thermal conductance greater than 2, 3, or 4 W/K. The first helical fin can include a turbulence-inducing micro-textured surface comprising micro-sized protrusions extending into the helical gas passageway.

In some examples, a heat exchanger can include an inlet manifold having a liquid inlet configured to receive a liquid, a first inlet manifold portion fluidly connected to the liquid inlet, and a second inlet manifold portion fluidly connected to the liquid inlet. The heat exchanger can include a first plurality of submanifolds fluidly connecting the first inlet manifold portion to the second inlet manifold portion. The heat exchanger can include a plurality of liquid passageways fluidly connecting the first plurality of submanifolds to a second plurality of submanifolds. The heat exchanger can include an outlet manifold having a liquid outlet configured to discharge liquid, a first outlet manifold portion fluidly connected to the liquid outlet, and a second outlet manifold portion fluidly connected to the liquid outlet, where the second plurality of submanifolds fluidly connect the first outlet manifold portion to the second outlet manifold portion. The heat exchanger can include a plurality of helical gas passageways extending from a first side of the heat exchanger to a second side of the heat exchanger. A first helical gas passageway of the plurality of helical gas passageways can extend along and around a first outer surface of a first liquid passageway of the plurality of liquid passageways and can be in direct thermal communication with the first liquid passageway.

The heat exchanger can be 3D-printed using a printable material such as a polymer, polymer-ceramic composite, polymer-metal composite, carbon composite, carbon nanotubes, graphene, metal composite, metal alloy, or metal. Additive manufacturing can produce a jointless heat exchanger that eliminates risk of joint leakage.

Additional objects and features of the invention are introduced below in the Detailed Description and shown in the drawings. While multiple embodiments are disclosed, still other embodiments will become apparent to those skilled in the art from the following Detailed Description, which shows and describes illustrative embodiments. As will be realized, the disclosed embodiments are susceptible to modifications in various aspects, all without departing from the scope of the present disclosure. Accordingly, the drawings and detailed description are to be regarded as illustrative in nature and not restrictive.

This Summary is provided to introduce a selection of concepts in a simplified form that are further described in the Detailed Description below. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTIONS OF DRAWINGS

Figure 1:
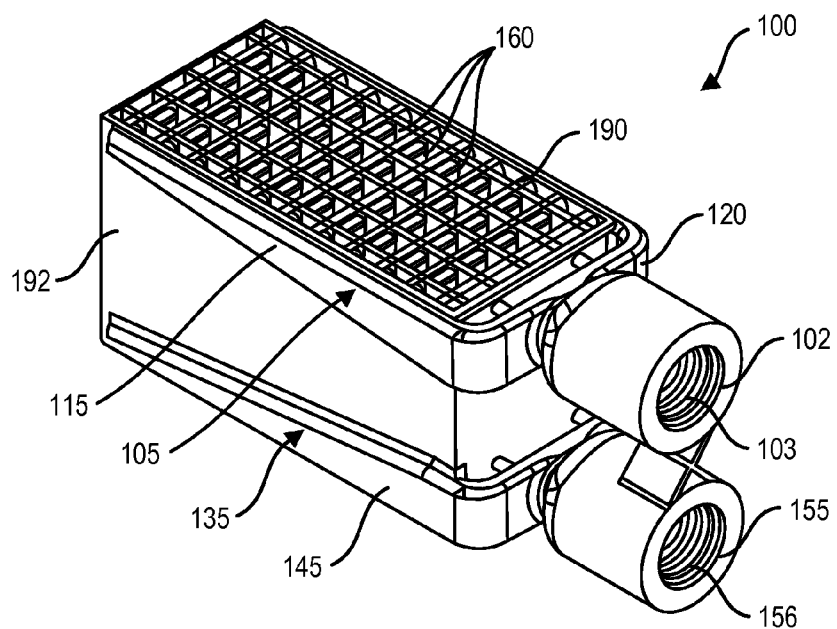
FIG. 1 shows a top perspective view of a heat exchanger.
Figure 8:
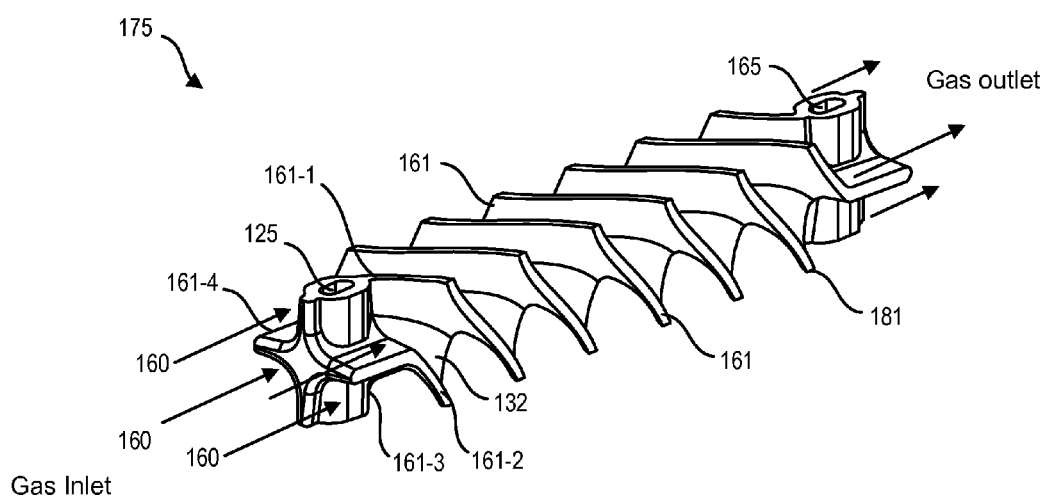

FIG. 8 shows a fluid transfer member of the heat exchanger of FIG. 1, the fluid transfer member having one liquid passageway extending lengthwise through a center region of the fluid transfer member, four helical gas passageways extending along and wrapping around the liquid passageway, the helical gas passageways formed by four helical fins extending outward from and rotating along an outer surface of the fluid transfer member.

Figure 9:
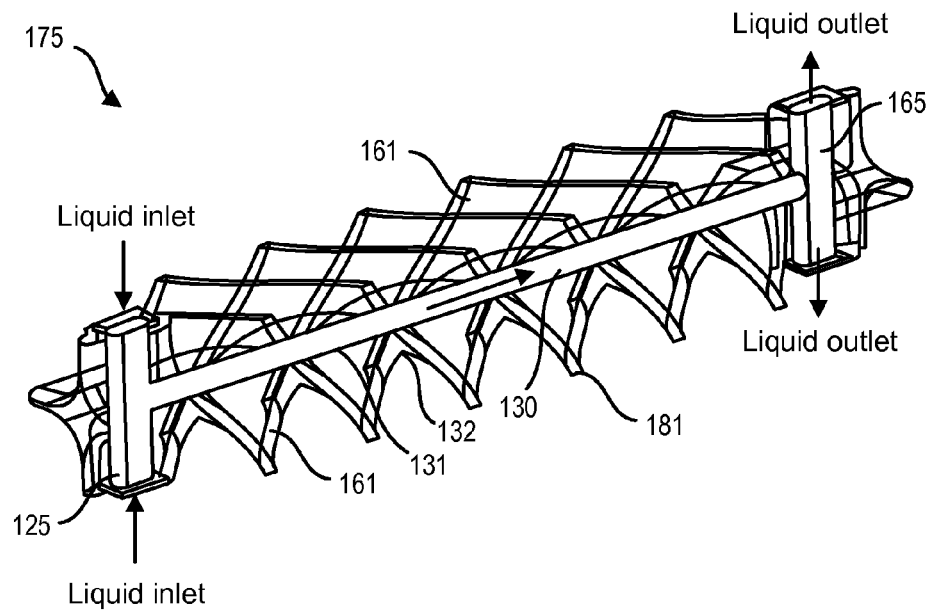

FIG. 9 shows a lengthwise cross-sectional perspective view of the fluid transfer member of FIG. 8, the fluid transfer member having a liquid passageway extending lengthwise through the center of the fluid transfer member and four helical gas passageways extending along and wrapping around the liquid passageway, the helical gas passageways formed by four helical fins extending outward from and wrapping along an outer surface of the liquid passageway.

Figure 10:
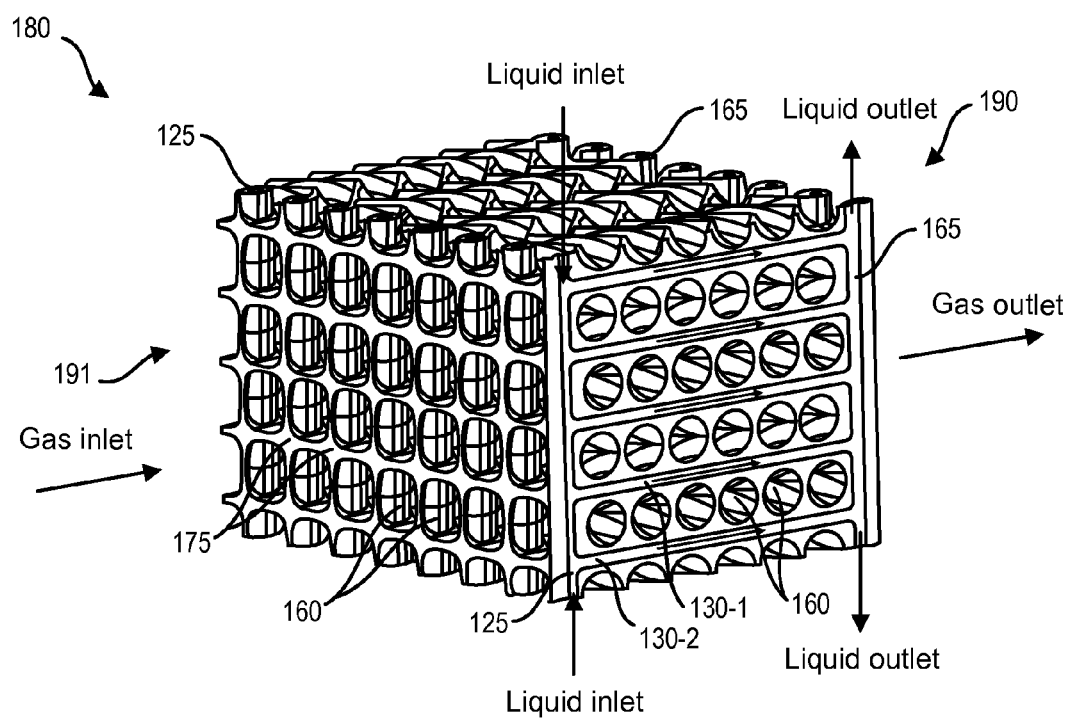

FIG. 10 shows a cross-sectional perspective view of a portion of the heat exchanger of FIG. 1 exposing an inlet submanifold fluidly connected to an outlet submanifold by a plurality of liquid passageways with helical gas passageways extending along and wrapping around the liquid passageways.

Figure 11:
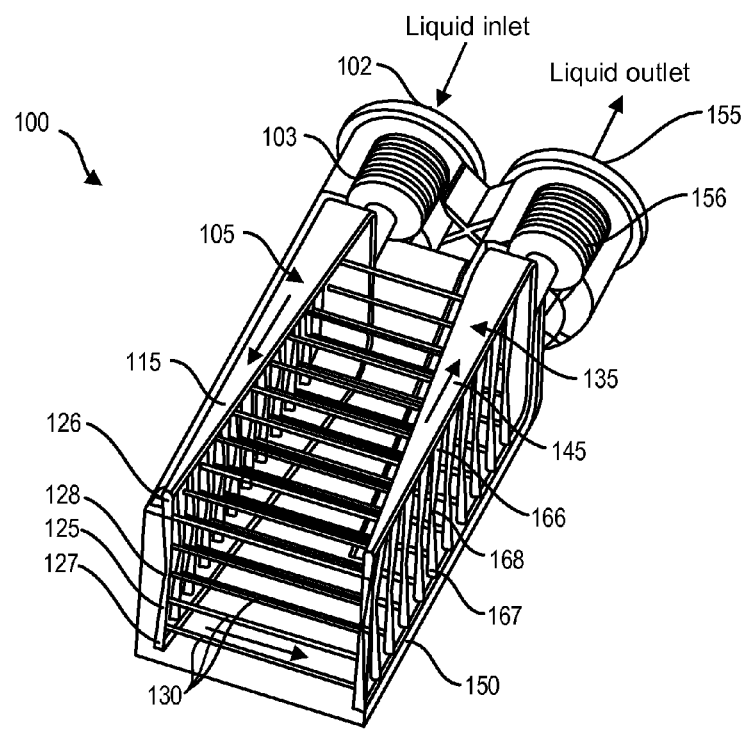

FIG. 11 shows a simplified side perspective view of the heat exchanger of FIG. 1, the simplified view omitting the helical gas passageways to allow a liquid flow path from a main inlet to a main outlet to be clearly shown, the liquid flow path including a dual tapered inlet manifold, inlet submanifolds, liquid passageways, outlet submanifolds, and a dual tapered outlet manifold.

Figure 12:
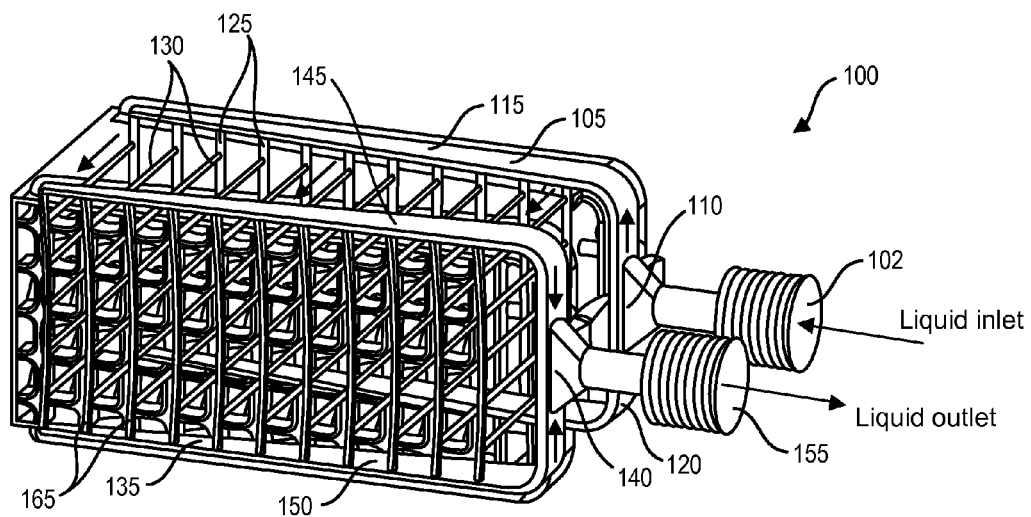

FIG. 12 shows a simplified bottom perspective view of the heat exchanger of FIG. 1, the simplified view omitting the helical gas passageways to allow a liquid flow path from a main inlet to a main outlet to be clearly shown, the liquid flow path including a dual tapered inlet manifold, inlet submanifolds, liquid passageways, outlet submanifolds, and a dual tapered outlet manifold.

Figure 13:
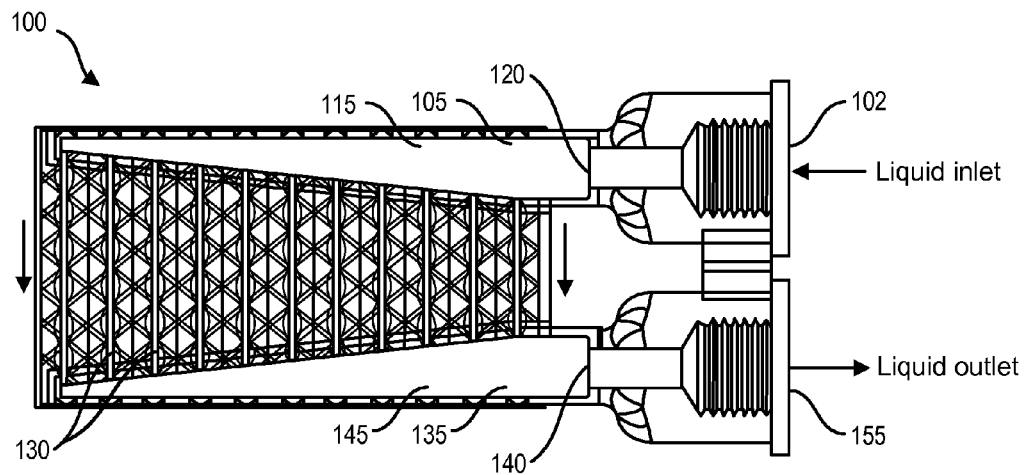

FIG. 13 shows a simplified left side view of the heat exchanger of FIG. 1, the simplified view omitting the helical gas passageways to allow a liquid flow path from a main inlet to a main outlet to be clearly shown, the liquid flow path including a dual tapered inlet manifold, inlet submanifolds, liquid passageways, outlet submanifolds, and a dual tapered outlet manifold.

Figure 14:
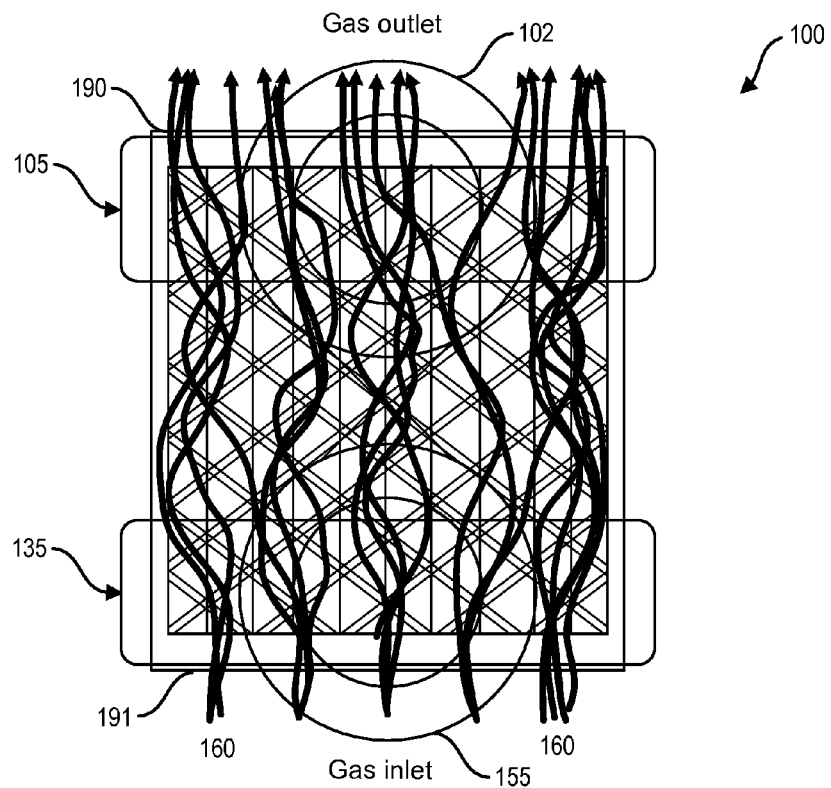

FIG. 14 shows a simplified rear view of the heat exchanger of FIG. 1, the simplified view showing helical gas flow paths through the heat exchanger.

Figure 15:
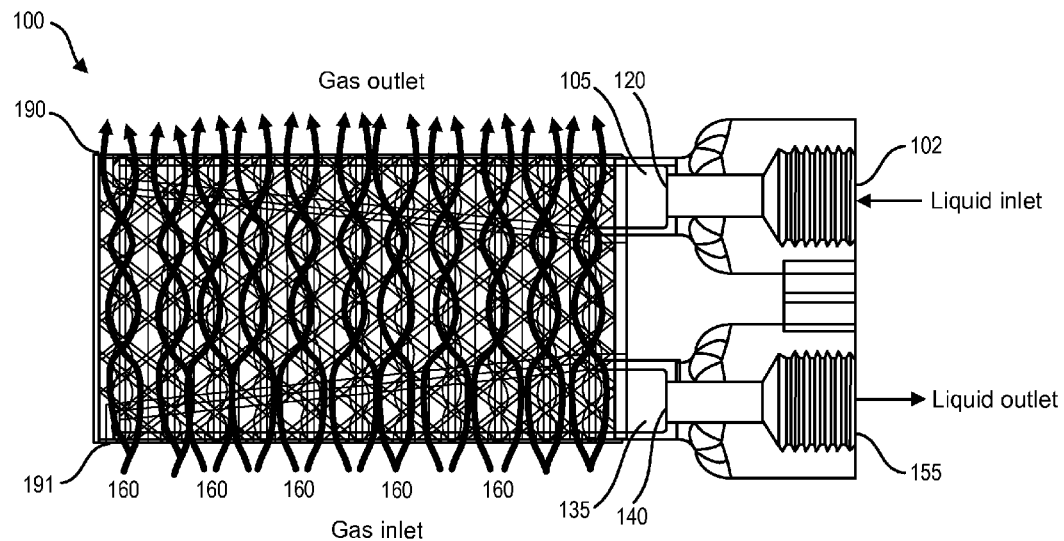

FIG. 15 shows a simplified left side view of the heat exchanger of FIG. 1, the simplified view showing helical gas flow paths through the heat exchanger.

Figure 16:
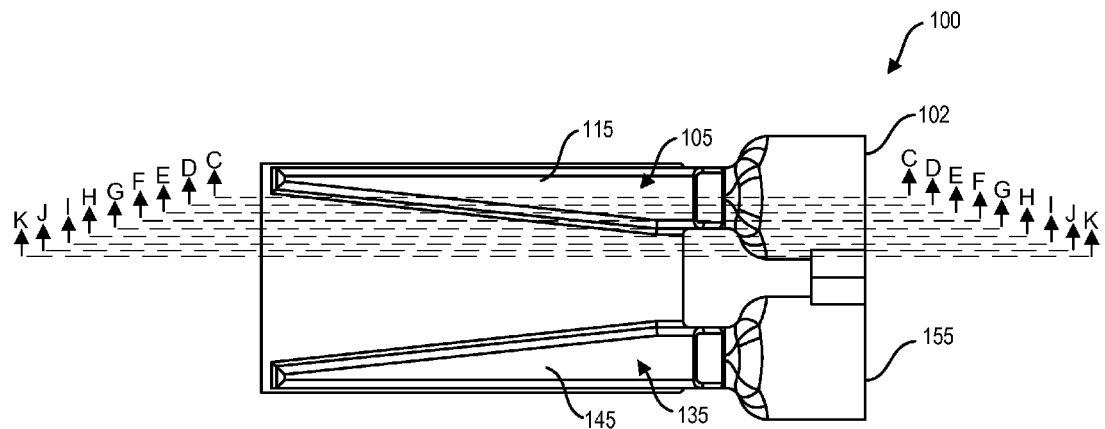

FIG. 16 shows a left side view of the heat exchanger of FIG. 1 showing sections C-C through K-K where section C-C bisects a main liquid inlet and each subsequent section is spaced 1 mm inward from the section immediately preceding it alphabetically.

Figure 17:
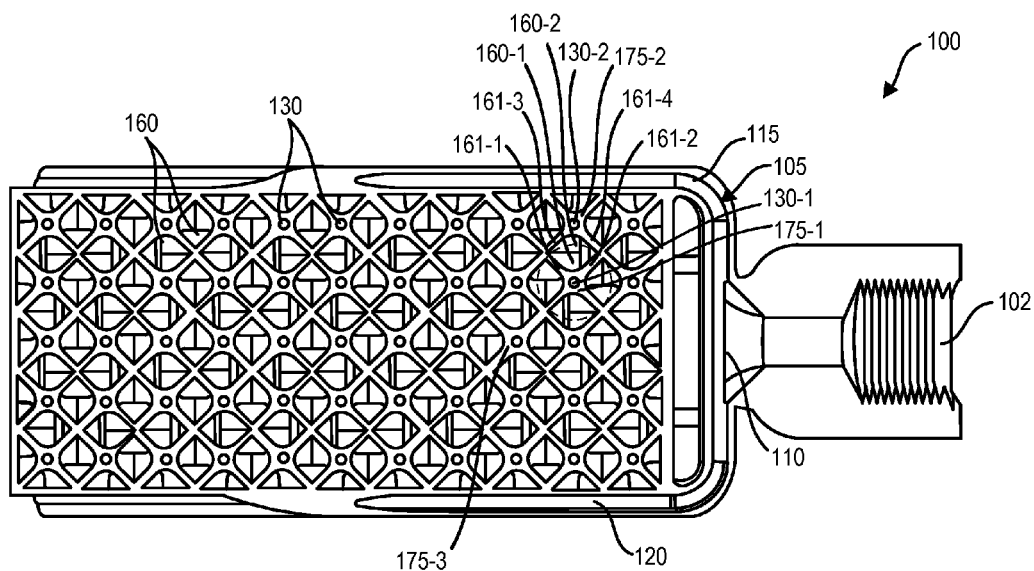

FIG. 17 shows a bottom cross-sectional view of the heat exchanger of FIG. 16 taken along section C-C.

Figure 18:
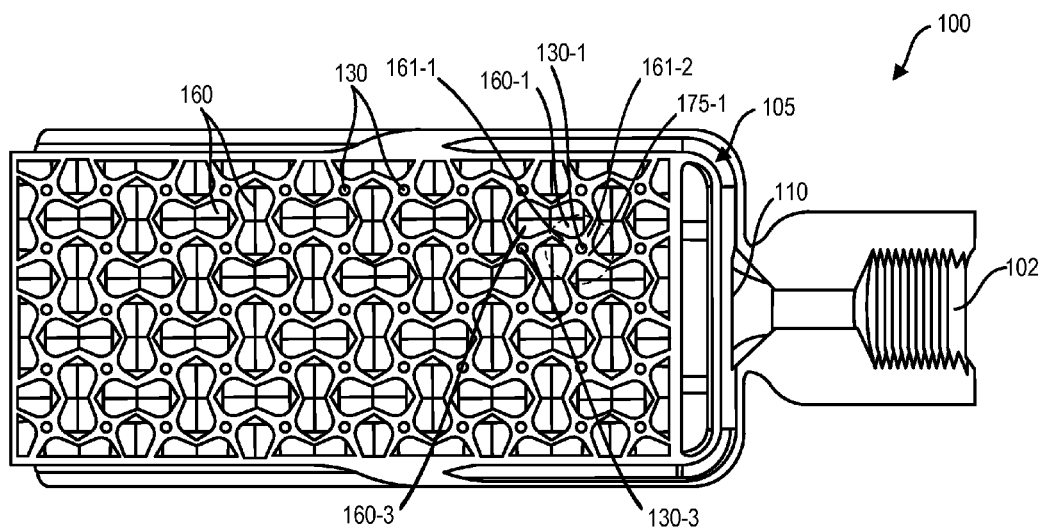

FIG. 18 shows a bottom cross-sectional view of the heat exchanger of FIG. 16 taken along section D-D.

Figure 19:
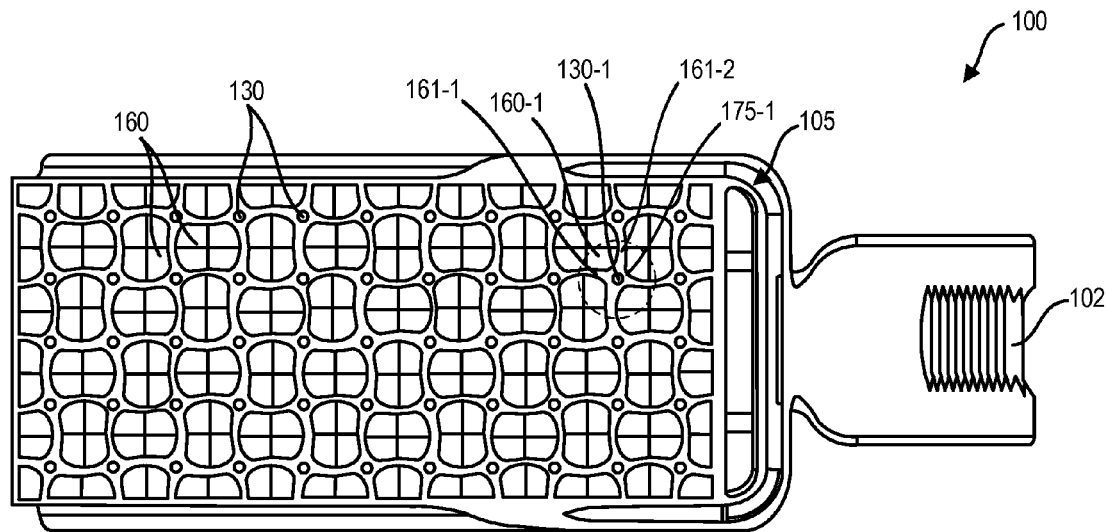

FIG. 19 shows a bottom cross-sectional view of the heat exchanger of FIG. 16 taken along section E-E.

Figure 20:
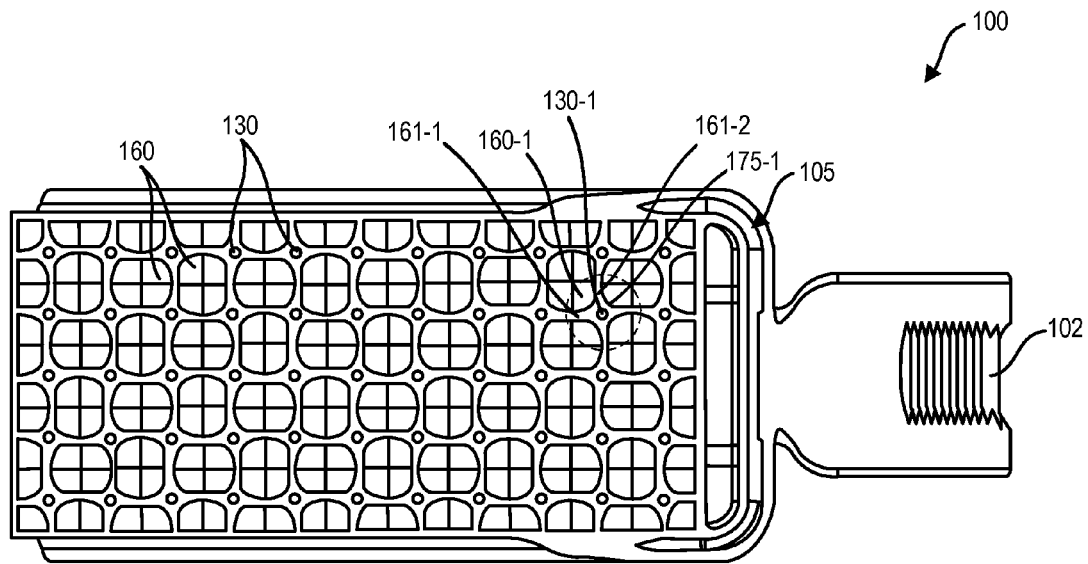

FIG. 20 shows a bottom cross-sectional view of the heat exchanger of FIG. 16 taken along section F-F.

Figure 21:
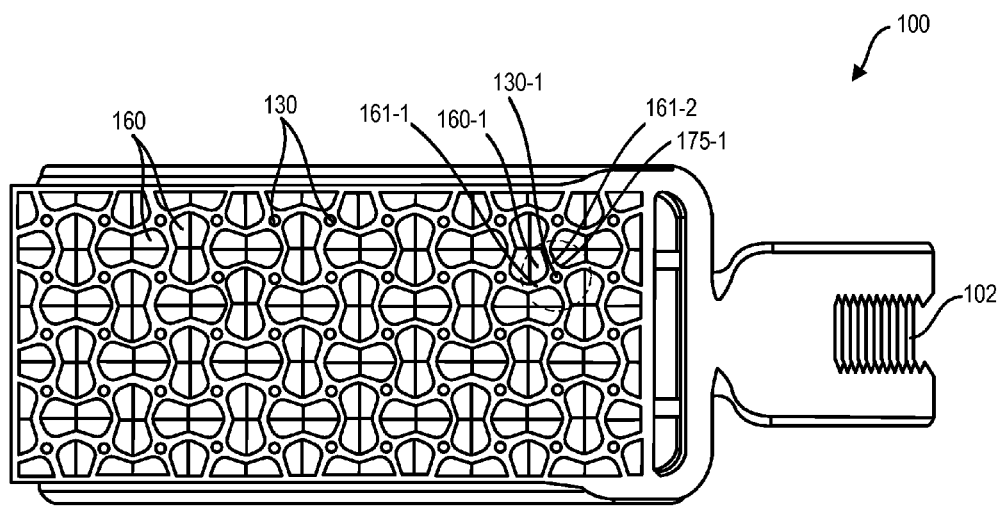

FIG. 21 shows a bottom cross-sectional view of the heat exchanger of FIG. 16 taken along section G-G.

Figure 22:
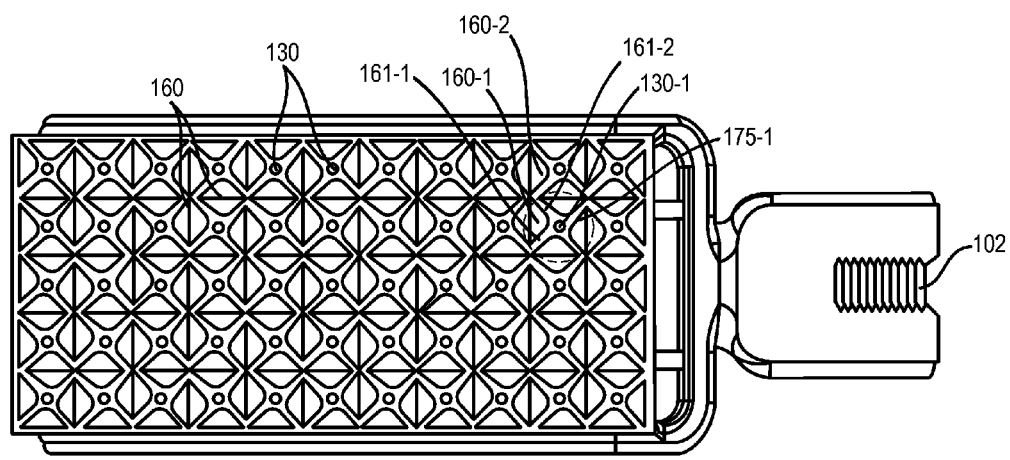

FIG. 22 shows a bottom cross-sectional view of the heat exchanger of FIG. 16 taken along section H-H.

Figure 23:
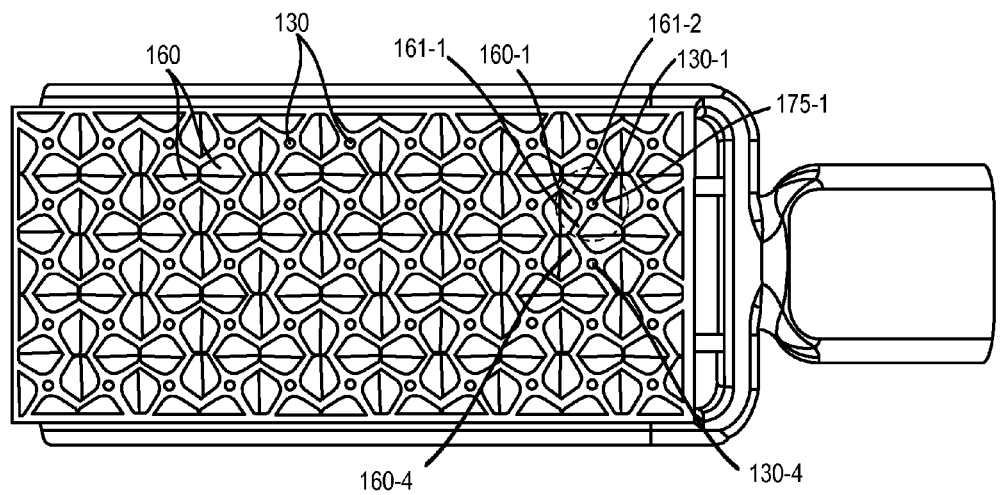

FIG. 23 shows a bottom cross-sectional view of the heat exchanger of FIG. 16 taken along section I-I.

Figure 24:
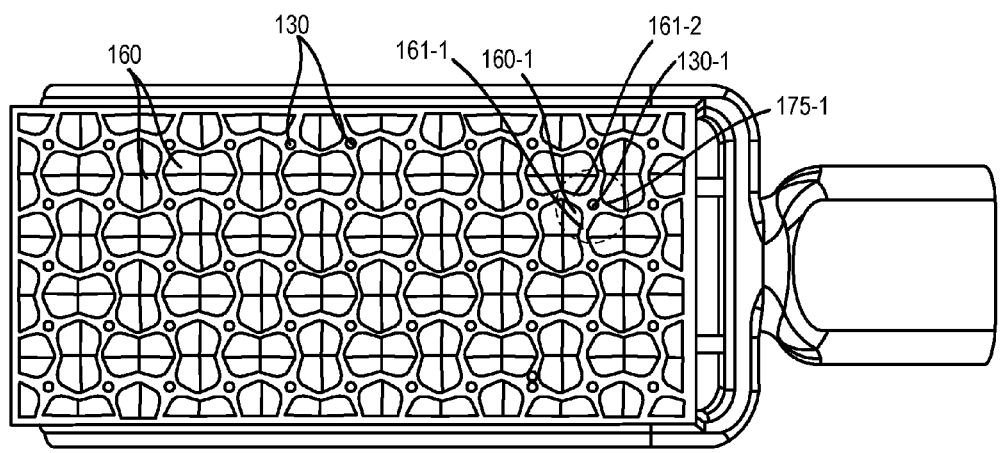

FIG. 24 shows a bottom cross-sectional view of the heat exchanger of FIG. 16 taken along section J-J.

Figure 25:
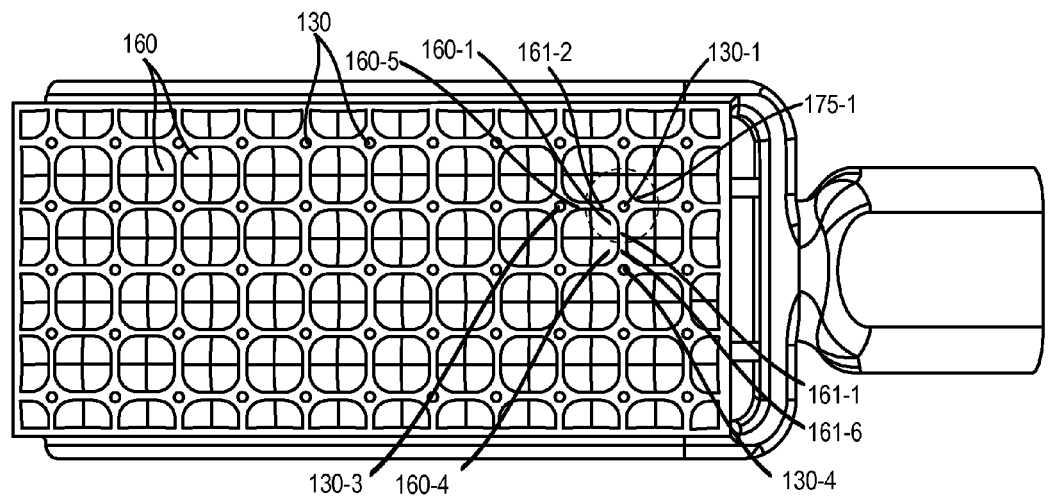

FIG. 25 shows a bottom cross-sectional view of the heat exchanger of FIG. 16 taken along section K-K.

Figure 26:
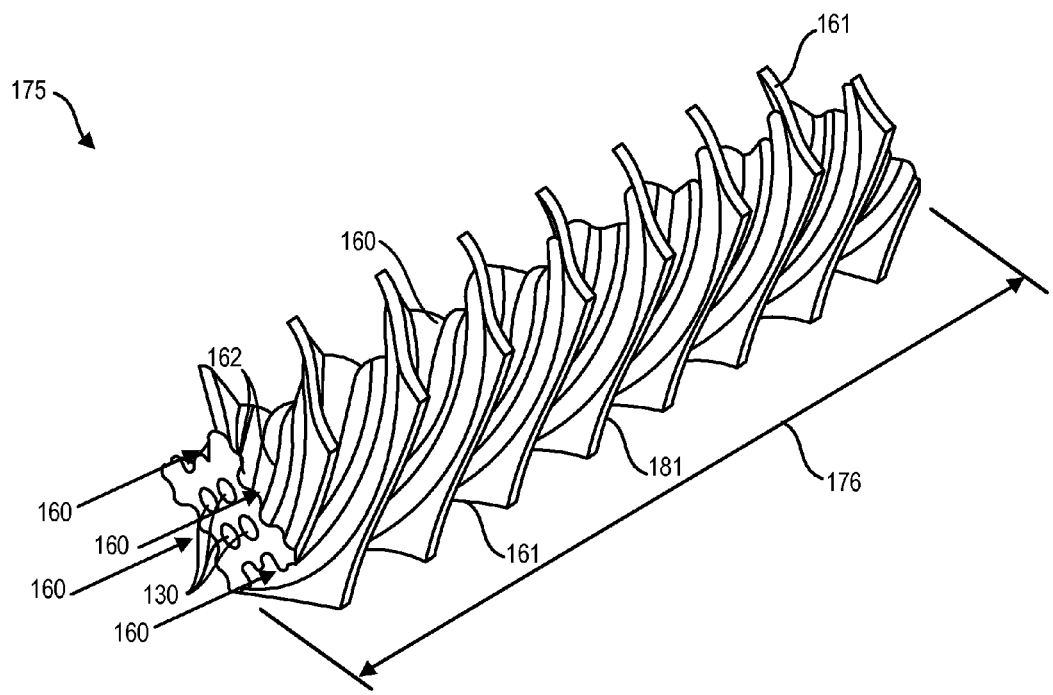

FIG. 26 shows a fluid transfer member having four liquid passageways extending lengthwise through a center region of the fluid transfer member, four helical gas passageways extending along and wrapping around the four liquid passageways, and eight helical grooves extending along and wrapping around the liquid passageways, the helical gas passageways formed by four helical fins extending outward from and rotating along an outer surface of the fluid transfer member.

FIG. 27 shows a fluid transfer member having a liquid passageway extending lengthwise through a center region of the fluid transfer member and eight helical gas passageways extending along and wrapping around the liquid passageway, the helical gas passageways formed by eight helical fins extending outward from and rotating along an outer surface of the fluid transfer member.

FIG. 28A shows a cross-sectional quarter view of the fluid transfer member of FIG. 8 revealing one liquid passageway, one helical gas passageway, and two fins.

FIG. 28B shows a cross-sectional quarter view of the fluid transfer member of FIG. 26 revealing two liquid passageways, two fins, one helical gas passageway, and two grooves.

FIG. 28C shows a cross-sectional quarter view of the fluid transfer member of FIG. 27 revealing one liquid passageway, three fins, and two helical gas passageways.

Figure 29:
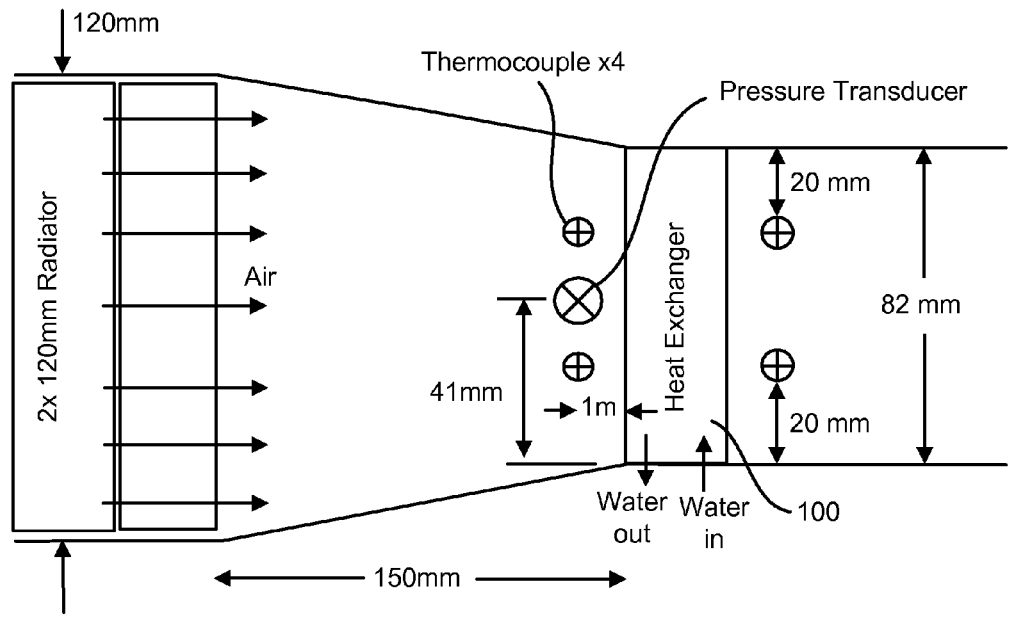

FIG. 29 shows a schematic of an experimental test setup for evaluating performance of heat exchangers.

Figure 30:
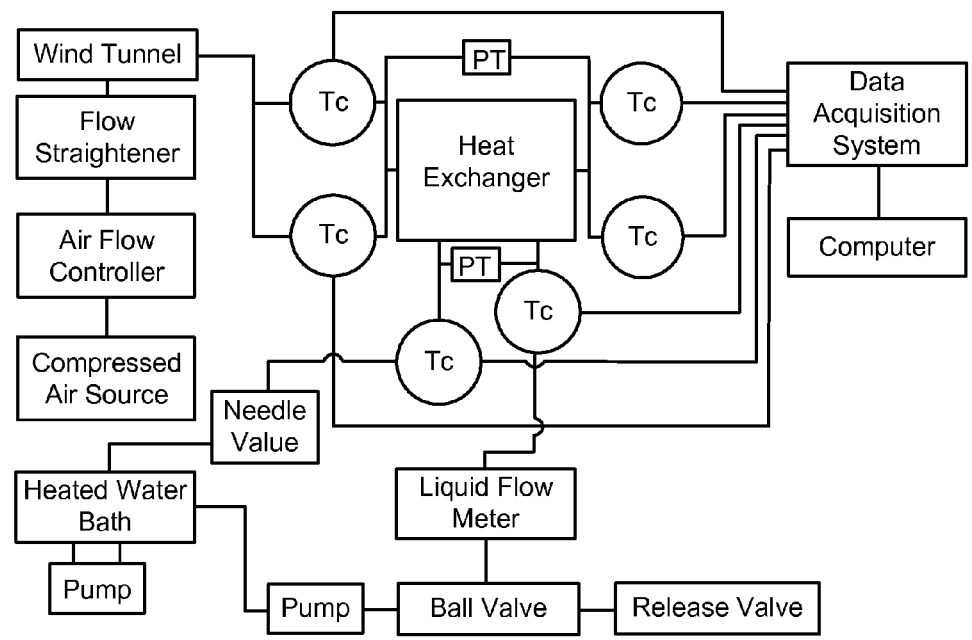

FIG. 30 shows a block diagram of an experimental test setup for evaluating performance of a heat exchanger.

Figure 31:
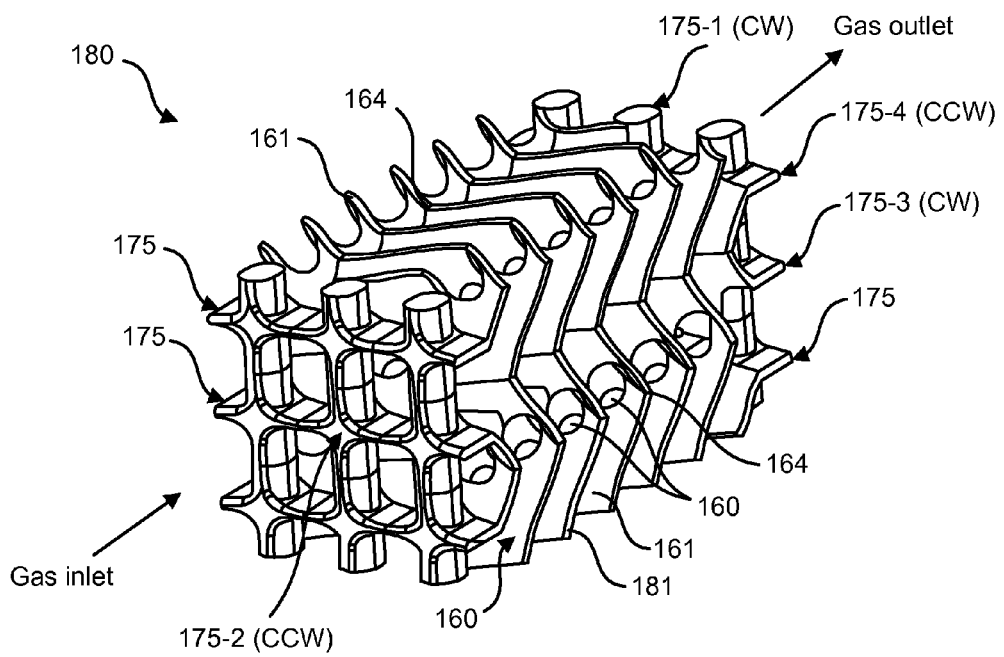

FIG. 31 shows a perspective view of a portion of a heat exchanger having a stacked array of nine interconnected fluid transfer members similar to the fluid transfer member shown in FIG. 8.

Figure 32:
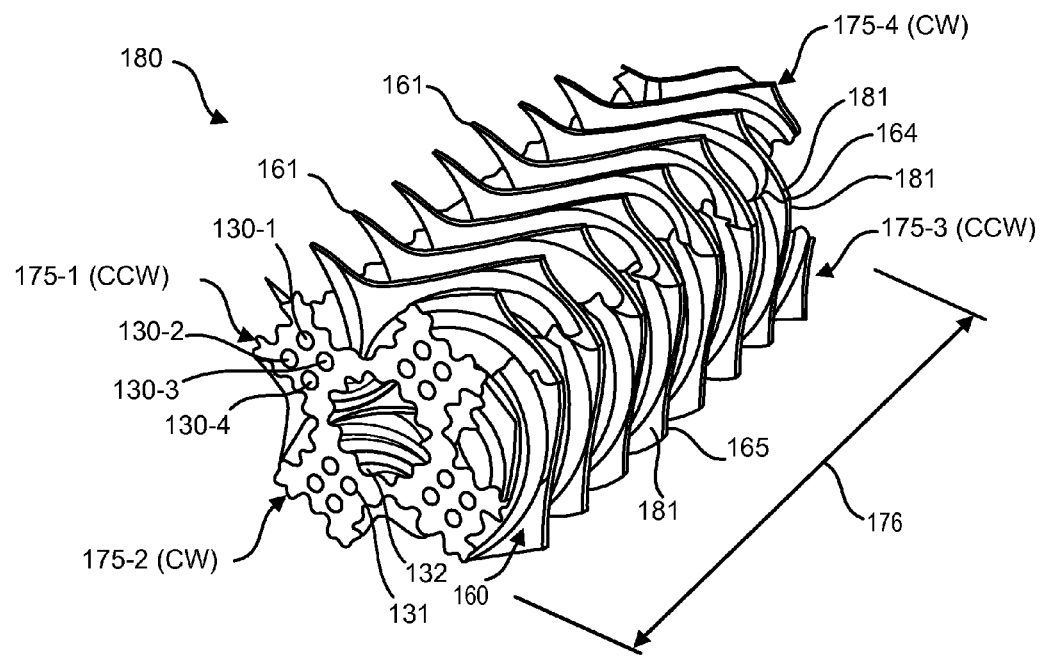

FIG. 32 shows a perspective view of a portion of a heat exchanger having a stacked array of four interconnected fluid transfer members similar to the fluid transfer member shown in FIG. 26.

Figure 33:
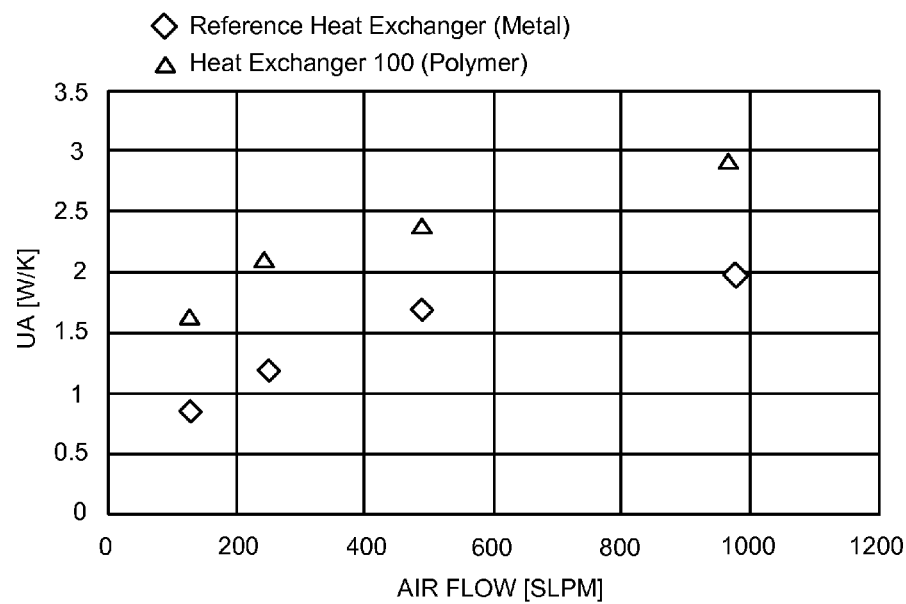

FIG. 33 shows a plot of experimental test results for the heat exchanger of FIG. 1 versus a reference heat exchanger, the test results showing thermal conductance versus air flow.

Figure 6:
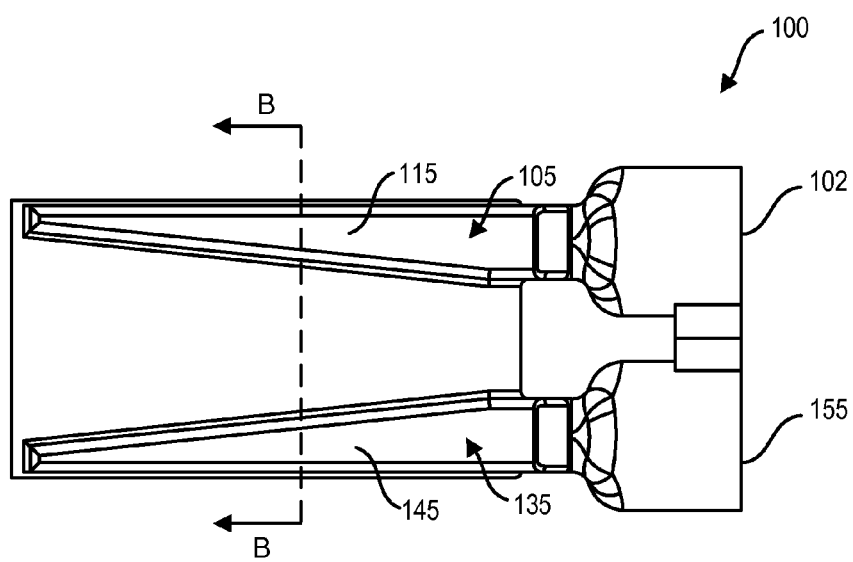
FIG. 6 shows a left side view of a heat exchanger of FIG. 1.
Figure 34:
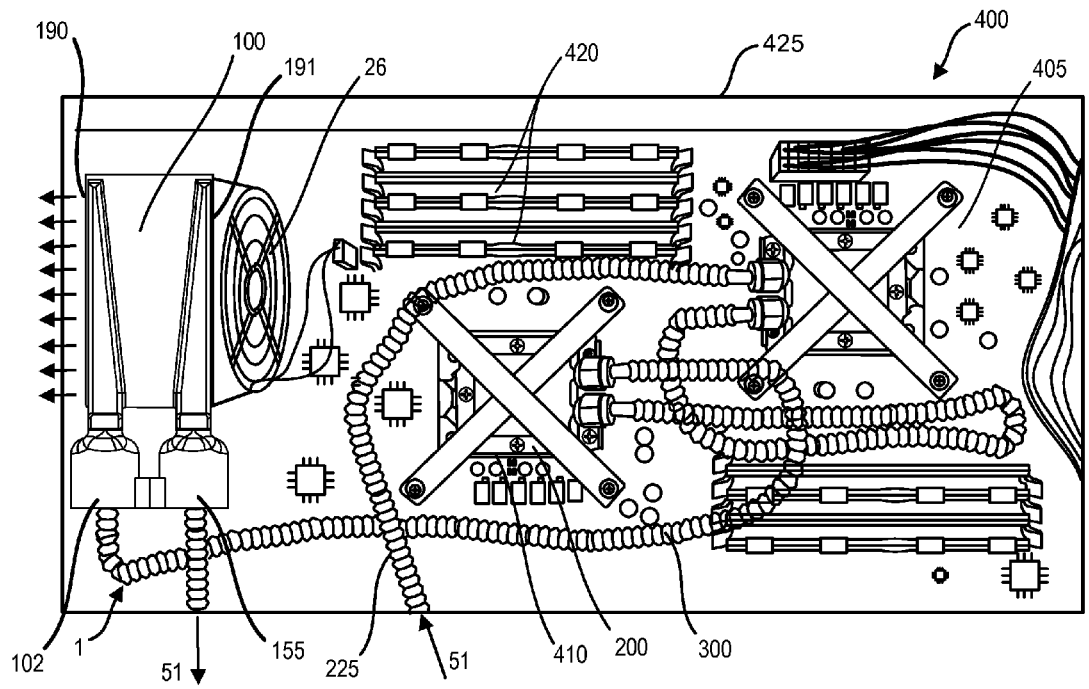

FIG. 34 shows a cooling system installed in a computer, the cooling system having a heat exchanger as shown in FIG. 6 and a fan mounted to the heat exchanger to force air through helical gas passageways of the heat exchanger.

DETAILED DESCRIPTION

Liquid-to-gas heat exchangers have been around since the late 1800s. Since then, the basic structures and configurations of liquid-to-gas heat exchangers have remained virtually unchanged, with only minor improvements being made despite significant advances in both manufacturing techniques and computational fluid dynamics software. Existing liquid-to-gas heat exchangers are limited by poor gas-side performance, which is primarily due to low thermal conductivity and low thermal capacity of gas. A primary objective of the heat exchangers disclosed herein is to provide dramatically improved performance over existing heat exchangers, especially gas-side performance.

The heat exchangers 100 disclosed herein provide dramatically improved performance over existing liquid-to-gas heat exchangers by incorporating one or more of the following features: helical gas-side passageways that induce turbulent-like swirling flows, true counter-flow operation, jointless construction, variable thickness helical fins, mini or micro surface treatments on the helical fins, liquid and gas passageways that achieve low pressure losses during use, small liquid volume requirements, corrosion-resistant materials, flow-optimized dual tapered inlet and outlet manifolds, flow-optimized submanifolds, hydrophobic materials to minimize fouling, high heat transfer rates, homogenous construction with uniform thermal conductivity, and low masses (dry and operating). In addition, the heat exchangers 100 disclosed herein can be manufactured in nearly any form factor to suit a wide variety of applications and to allow previously unusable space in vehicles, equipment, appliances, and electronic devices to house custom-shaped, high-performing heat exchangers.

Heat exchangers are commonly made of metals, such as copper, aluminum, or steel. These metals exhibit high thermal conductivity and high structural integrity, which are often desirable attributes for materials used in heat exchangers. Unfortunately, these metals are heavy and costly to transport and are subject to varying global demand and availability. Moreover, fabrication of metal heat exchangers can be difficult, requiring time and energy-intensive manufacturing techniques, such as brazing or welding, that must be performed by sophisticated machines or skilled craftspeople. As energy and material costs rise, it is desirable to find alternative lower cost materials that can be used in next-generation heat exchangers. Unfortunately, most alternative materials, such as polymers, have significantly lower thermal conductivities than commonly used metals. If polymers are simply substituted for metals in existing heat exchanger designs, the heat exchangers will fail to meet performance requirements. Specifically, the gas-side performance of the heat exchangers will be poor due to the low thermal conductivity of polymers, resulting in low overall performance. Successfully replacing metal heat exchangers with polymer heat exchangers requires developing new, innovative heat exchanger designs that achieve high heat transfer rates despite low thermal conductivities of the underlying structure. This disclosure sets forth a number of additive-manufactured heat exchanger designs that successfully achieve high heat transfer rates despite low thermal conductivities of the underlying structure.

FIG. 1 shows a compact heat exchanger 100 suitable for a wide variety of applications, including computer cooling. The heat exchanger 100 can have any suitable shape depending upon its intended application and can have any suitable size depending on performance requirements. In some examples, as shown in FIG. 1, the heat exchanger 100 can be a rectangular prism. The heat exchanger 100 can have a top side 190, bottom side 191, left side 192, right side 193, front side 194, and back side 195. In some examples, the heat exchanger 100 can be a counter-flow heat exchanger 100. In other examples, the heat exchanger can be a parallel flow or cross-flow heat exchanger. The heat exchanger 100 can be manufactured by an additive manufacturing process (also known as a 3D printing process). The heat exchanger 100 can be formed form a single material, which can be desirable, since it can eliminate thermal expansion issues commonly found in heat exchangers containing two or more dissimilar materials.

Thermal expansion issues are commonly encountered when a multi-part metal heat exchanger undergoes temperature transients, such as during start-up of a vehicle having an engine. In winter conditions, it is not uncommon for coolant flowing through an engine to rapidly transition from −20 degrees C. to 115 degrees C. or higher as the fluid circulates through the engine and absorbs heat from the engine block and cylinder heads. If the metal heat exchanger is made of two or more different metals with differing thermal expansion coefficients, the rapid temperature change resulting from heat transfer can produce stress at joints between the dissimilar metals. Over time, these repeated stresses can lead to leak formation at the joints and failure of the heat exchanger. In addition to thermal cycling and expansion issues, shock and vibration can also create joint failures in multi-part metal heat exchangers. Shock and vibration are commonly encountered in vehicle applications.

Producing a heat exchanger 100 using additive manufacturing avoids thermal expansion issues, since the heat exchanger is formed of only one homogeneous material and therefore has a uniform thermal expansion coefficient throughout. Another advantage of additive manufacturing is that it produces a jointless structure that completely eliminates the risk of joint leakage. A jointless heat exchanger 100 produced by additive manufacturing has high durability and is well suited for applications involving shock, vibration, and/or repeated temperature transients, such as vehicle applications.

The heat exchanger 100 can be made of any suitable polymer. Examples of suitable polymers include high-density polyethylene (HDPE), low-density polyethylene (LDPE), linear low-density polyethylene (LLDPE), polypropylene (PP), polyvinyl chloride (PVC), polystyrene (PS), polymethyl methacrylate (PMMA), polyethylene terephthalate (PET), acrylonitrile butadiene styrene (ABS), Nylon-66, polycarbonate, (PC), polyvinylidene fluoride (PVDF), polytetrafluoroethylene (PTFE), ultra-high molecular weight polyethylene (UHMWPE), polyphenylene sulphide (PPS), and polyphenylene oxide (PPO). Other suitable polymers include proprietary materials such as ACCURA BLUESTONE plastic from 3D Systems, Inc. of Rock Hill, S.C. Table 1 provides a list of non-proprietary polymers that can be used in additive manufacturing and their corresponding material properties.

engineers, but experimental testing of the polymer heat exchanger 100 has confirmed superior performance over a similarly sized metal heat exchanger (see FIG. 33), which is partially attributable to low axial conduction.

To promote heat transfer from the hot liquid to the cold gas, the walls of the liquid passageways can be very thin. As shown, in FIGS. 9 and 28A, 28B, and 28C, regardless of the number and shape of the helical fins 161 and helical gas passageways 160, the wall thickness 133 of the liquid passageway can be very thin. In some examples, the liquid passageway 130 can have a diameter of about 0.02-0.04, 0.03-0.05, 0.04-0.06, 0.05-0.07, or 0.06-0.08 inches. In the

TABLE 1

Standard non-proprietary polymers

| Polymer | Solid Density* $\rho$ (g/cm$^3$) | Glass Transition $T_g$ | Melting Point $T_m$ | Usual Melt Processing Range | Melt Density* $\rho$ (kg/m$^3$) | Thermal Conductivity k (W/m ° C.) (Btu/h ft ° F.) | Heat Capacity Cp (J/kg ° C.) (Btu/lb$_m$ ° F.) | Heat of Fusion ΔH (J/kg) (Btu/lb) |
|---|---|---|---|---|---|---|---|---|
| HDPE | 0.941-0.967 | −130° C. −202° F. | 130-137° C. 266-278° F. | 160-240° C. 320-464° F. | 780 | 0.25 0.145 | 2200-2400 0.52-0.57 | 210,000-300,000 90-130 |
| LDPE | 0.915-0.935 | −130° C. −202° F. | 106-112° C. 223-234° F. | 160-240° C. 320-464° F. | 760 | 0.20 0.115 | 2200-2400 0.52-0.57 | 190,000-240,000 80-100 |
| LLDPE | 0.910-0.925 | −130° C. −202° F. | 125° C. 257° F. | 160-240° C. 320-464° F. | 760 | 0.20 0.115 | 2200-2400 0.52-0.57 | 190,000-240,000 80-100 |
| PP | 0.890-0.910 | −20° C. −4° F. | 165° C. 329° F. | 180-240° C. 356-464° F. | 730 | 0.18 0.10 | 2000-2200 0.48-0.52 | 210,000-260,000 90-110 |
| PVC (Rigid) | 1.30-1.58 | 80° C. 176° F. | 175° C. 347° F. | 165-205° C. 329-401° F. | 1250 | 0.17 0.10 | 1000-1700 0.24-0.41 | 170,000-190,000 70-80 |
| PS | 1.04-1.10 | 100° C. 212° F. | amorphous** | 180-240° C. 356-464° F. | 1000 | 0.15 0.09 | 1300-2000 0.31-0.48 | amorphous** |
| PMMA | 1.17-1.20 | 105° C. 221° F. | amorphous** | 180-230° C. 356-446° F. | 1050 | 0.19 0.11 | 1400-2400 0.33-0.57 | amorphous** |
| PET | 1.34-1.39 | 80° C. 176° F. | 265° C. 509° F. | 275-290° C. 527-554° F. | 1160 | 0.18 0.10 | 1800-2000 0.43-0.48 | 120,000-140,000 50-60 |
| ABS | 1.01-1.04 | 105-115° C. 221-239° F. | amorphous** | 200-290° C. 392-554° F. | 990 | 0.25 0.145 | 1300-1700 0.31-0.41 | amorphous** |
| Nylon-66 | 1.13-1.15 | 90° C. 194° F. | 265° C. 509° F. | 275-290° C. 527-554° F. | 980 | 0.20 0.115 | 2400-2600 0.57-0.62 | 190,000-205,000 80-88 |
| PC | 1.2 | 140° C. 284° F. | amorphous** | 250-305° C. 482-581° F. | 1050 | 0.22 0.13 | 1300-2200 0.31-0.52 | amorphous** |

Axial conduction (i.e. conduction along the walls of flow pathways) occurs when heat transfers along the walls of the passageways of the heat exchanger from hot parts of the heat exchanger to cold parts. Axial conduction is common in metal heat exchangers, which have high thermal conductivities. Axial conduction is a significant source of inefficiency in metal heat exchangers, since it causes the minimum wall temperature of the cold fluid to increase (e.g. the walls of the gas passageway for the cold air inlet get warmer) and causes the maximum wall temperature of the hot fluid to decrease (e.g. the walls of the liquid passageway for the hot liquid get cooler). As a result, the temperature difference between the counter-flowing streams decrease, as does the heat transfer rate. In contrast, heat exchangers 100 made of polymers (which have low thermal conductivities) experience low rates of axial conduction, which is an advantage. These low rates of axial conduction allow for greater temperature differentials to be maintained between inlet and outlet flows of both the gas and liquid throughout the heat exchanger 100. As a result, the polymer heat exchanger 100 exhibits higher heat transfer rates between the counter flowing gas and liquid streams, which improves operating efficiency. In some examples, the heat exchanger 100 can be made from a polymer having a thermal conductivity less than 50 W/m-K and preferably less than 10, 5, 2, or 0.5 W/m-K. Selecting a material with a low thermal conductivity can be counterintuitive for heat exchanger example shown in FIG. 28A, the wall thickness 133 of the liquid passageway 130 is about equal to the diameter of the liquid passageway. In other words, the wall thickness 133 of the liquid passageway 130 can be about can have a diameter of about 0.02-0.04, 0.03-0.05, 0.04-0.06, 0.05-0.07, or 0.06-0.08 inches. In the example shown in FIG. 28B, the wall thickness 133 of the liquid passageway 130 is less than the diameter of the liquid passageway. In the example shown in FIG. 28C, the wall thickness 133 of the liquid passageway 130 is greater than diameter of the liquid passageway. The thinner wall configuration shown in FIG. 28B can be suitable for lower-pressure liquids, and the thicker wall configuration shown in FIG. 28C can be suitable for higher-pressure liquids.

In larger applications, the diameter of the liquid passageway 130 can be larger than 0.08 inches to provide higher liquid flow rates. However, to ensure high heat transfer rates, it can be desirable to maintain the wall thickness 133 as thin as possible while taking into account the liquid pressure and material properties of the wall material.

Due to the relatively narrow liquid passageways 130, the heat exchanger 100 can have a relatively small liquid volume compared to traditional heat exchangers. The term "liquid volume" can include the collective volumes of all liquid passageways 130 within the heat exchanger 100 as well as manifolds, submanifolds, and any other passageways that allow the liquid to flow from an inlet 102 to an outlet 155 of the heat exchanger. Having a small liquid volume is desirable for several reasons. First, a small liquid volume provides a low total operating weight (i.e. heat exchanger weight plus liquid weight). Low operating weights are desirable in many applications, including motorsports and aerospace applications. Second, a small liquid volume requires less fluid in the cooling system 1. Where the liquid is an engineered fluid such as NOVEC, using less liquid can reduce system cost. Third, a small liquid volume requires lower liquid flow rates, which translates to less pump power consumption.

A polymer heat exchanger 100 can withstand temperatures up to 300 degrees C., allowing the polymer heat exchanger to be used in a wide variety of practical applications, including computer cooling, battery cooling, power generation, oil and gas recovery and processing, home heating and cooling, automotive heating and cooling, cooling of power electronics, chemical processing, cooling of medical imaging equipment, aerospace heating and cooling, waste heat recovery, food and beverage processing, and cooling components of home appliances (e.g. refrigerators and air conditioners). Where higher temperatures will be encountered, the heat exchanger 100 can be made of a polymer-ceramic composite, polymer-metal composite, metal composite, graphene, carbon fiber composite, carbon nanotubes, metal alloy, or metal that is better suited to withstand high working temperatures.

The material used to fabricate the heat exchanger 100 can be corrosion-resistant to provide a heat exchanger that is compatible with corrosive fluids, such as those encountered when recovering or refining petroleum or generating steam from soot-bearing exhaust gases produced in a coal-fired power plant. The corrosion-resistant heat exchanger 100 can be compatible with salt water, allowing it to be used in marine applications. Suitable corrosion-resistant materials include polyolefins, polyvinyl chlorides, and fluorpolymers. Suitable corrosion-resistant polyolefins include PE and PP. Suitable corrosion-resistant polyvinyl chlorides include PCV and chlorinated polyvinyl chloride (CPVC). Suitable corrosion-resistant fluoropolymers include PTFE, fluorinated ethylene propylene (FEP), perfluoroalkoxy (PFA), polyvinylidene fluoride (PVDF), polychlorotrifluoroethylene (PCTFE), ethylene chlorotrifluoroethylene (ECTFE), and ethylene tetrafluoroethylene (ETFE).

The material used to fabricate the heat exchanger 100 can be hydrophobic to reduce the potential of fouling in gas and liquid passageways within the heat exchanger 100. When a hydrophobic material is used in the heat exchanger, the macroscopic surfaces of the liquid passageways are not wetted by the liquid and the fluid does not penetrate the surface of the liquid passageways. Consequently, the liquid passageways do not become swollen with liquid and are less likely to experience fouling. Moreover, the liquid passageways do not experience long-term deterioration in strength that is common in hydrophilic materials. Suitable hydrophobic materials include PE, PVC, PTFE, acrylic, and epoxy.

The heat exchanger 100 can be made of a material that can be cleaned, disinfected, and/or sterilized. Sterilization kills all viable microorganisms in the heat exchanger, whereas disinfection only reduces the number of viable microorganisms. Commonly used disinfectants include alcohol, iodophors, and quaternary ammonium compounds. Sterilizing the heat exchanger 100 can allow it to replace stainless steel heat exchangers in applications involving food and beverage processing and serving. Sterilization can involve any suitable method, such as exposure to high heat (e.g. exposure to steam within an autoclave) and/or UV light.

The heat exchanger 100 can be configured to promote heat transfer from a first fluid (e.g a liquid) to a second fluid (e.g. a gas, such as air). The heat exchanger 100 can include one or more passageways to transfer the first fluid (e.g. the liquid) and one or more passageways to transfer the second fluid (e.g. the gas). To facilitate heat transfer between the first and second fluids, the one or more passageways for the first fluid can be independent from, but in thermal communication with, the one or more passageways for the second fluid. By providing independent passageways, the heat exchanger 100 can prevent the first and second fluids from mixing. This can allow, for example, the liquid passageways to be fluidly connected to a hermetically sealed fluid distribution system. By preventing air or other gases from interacting with the liquid in the hermetically sealed fluid distribution system, premature degradation of the liquid and/or fouling of the liquid passageways can be avoided.

Figure 4:
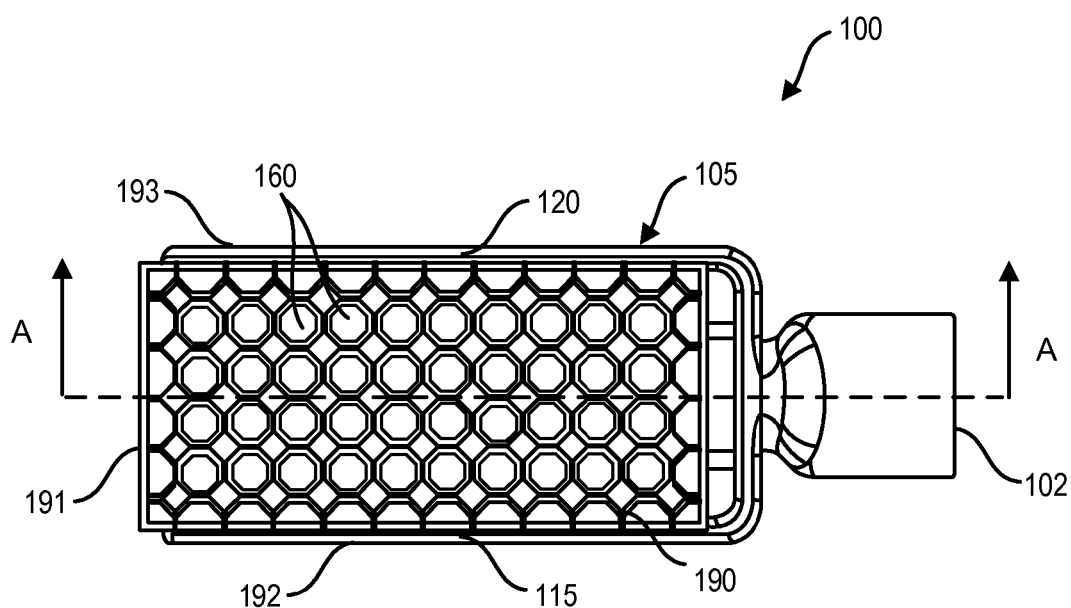
FIG. 4 shows a top view of a heat exchanger of FIG. 1.

The heat exchanger 100 can have an inlet manifold for receiving a first fluid, such as a liquid, from a main liquid inlet 102. In some examples, the inlet manifold can be a dual tapered inlet manifold 105, as shown in FIG. 1. The dual tapered inlet manifold 105 can include a liquid inlet 110, a first tapered inlet manifold portion 115 fluidly connected to the liquid inlet 110, and a second tapered inlet manifold portion 120 fluidly connected to the liquid inlet 110, as shown in FIGS. 1, 3, 11, 12, and 13. As used herein, the term "fluidly connected" refers to two components that are arranged in such a manner that a fluid can travel from a first component to a second component either directly or indirectly (e.g., through one or more other components, such as piping, passageways, or fittings). The first tapered inlet manifold portion 115 can taper in a direction away from the liquid inlet 110. The second tapered inlet manifold portion 120 can taper in a direction away from the liquid inlet 110. The tapered internal passageways of the first and second inlet manifold portions can provide even flow distribution of liquid from the manifold portions to a plurality of inlet submanifolds 125. Together, the first and second tapered inlet manifold portions (115, 120) can form a C-shape or a U-shape, as shown in FIG. 4.

As used herein, the term "thermal communication" refers to a relationship between two physical features of a heat exchanger where heat can flow, directly or indirectly, between the two physical features. The term "direct thermal communication" refers to a relationship between two physical features of the heat exchanger where heat flows through a single, shared wall from the first feature to the second feature. An example of direct thermal communication is shown in FIG. 28A where heat from the liquid passageway 130 can flow directly to the helical gas passageway 160 through a single, shared wall of the liquid passageway. By contrast, the term "indirect thermal communication" refers to a relationship between two physical features in the heat exchanger where heat must flow through two or more intervening walls or features to pass from the first feature to the second feature. Direct thermal communication produces far higher heat transfer rates than indirect thermal communication due to lower thermal resistance. Therefore, direct thermal communication is preferable in a heat exchanger 100 made of a material, such as a polymer, that has a low thermal conductivity.

In the example shown in FIG. 28A, the heat transfer rate is dictated by the thermal conductivity of the wall material, the temperature difference across the wall, the cross-sectional area of the heat flow path, and the thickness of the wall. While the thermal conductivity is fixed by the material selected, the cross-sectional area of the heat flow path and the thickness of the wall can be altered to increase the heat transfer rate, as shown in FIG. 28B. Reductions in the wall thickness 133 can produce higher heat transfer rates from the liquid passageway 130 to the helical gas passageway 160. The wall thickness 133 can be selected based on the operating pressure of the liquid flowing through the liquid passageway 130 and the material properties of the wall. When using the heat exchanger 100 with low pressure cooling systems 1 (e.g. 15-50 psig), the wall thickness 133 can be about 0.02-0.04, 0.03-0.05, 0.04-0.06, 0.05-0.07, or 0.06-0.08 in. When using the heat exchanger 100 with very low pressure cooling systems 1 (e.g. −10-10 psig), the wall thickness 133 can be less than 0.02 in. In low pressure and very low pressure cooling systems 1, the heat exchanger can provide exceptional gas-side performance due to thin wall thicknesses 133 and high heat transfer rates possible due to direct thermal communication through a single wall between the liquid passageways 130 and the helical gas passageways.

The plurality of inlet submanifolds 125 can fluidly connect the first tapered inlet manifold 115 to the second tapered inlet manifold portion 120. Each inlet submanifold 125 can include a first end 126 and a second end 127 opposite the first end. The first end 126 can be fluidly connected to the first tapered inlet manifold 115, and the second end 127 can be fluidly connected to the second tapered inlet manifold 120. Between the first and second ends (126, 127), each inlet submanifold can have a tapered section 128. The tapered section 128 can neck down to provide a cross-sectional area that is about 10-20, 15-30, or 20-50 percent of the cross-sectional area near the first and second ends of the submanifold. The tapered sections 128 can provide uniform flow distribution of liquid from the inlet submanifolds 125 to a series of liquid passageways 130 that extend from, and are fluidly connected to, the inlet submanifold 125.

The heat exchanger 100 can have an outlet manifold for discharging the first fluid to a main liquid outlet 155. In some examples, the outlet manifold can be a dual tapered outlet manifold 135, as shown in FIG. 11-13. The dual tapered outlet manifold 135 can include a liquid outlet 140, a first tapered outlet manifold portion 145 fluidly connected to the liquid outlet 140, and a second tapered outlet manifold portion 150 fluidly connected to the liquid inlet 140, as shown in FIGS. 1, 3, and 11-13. The first tapered outlet manifold portion 145 can taper in a direction away from the liquid outlet 140. The second tapered outlet manifold portion 150 can taper in a direction away from the liquid outlet 140. Together, the first and second tapered outlet manifold portions (145, 150) can form a C-shape or a U-shape.

A plurality of outlet submanifolds 165 can fluidly connect the first tapered outlet manifold portion 145 to the second tapered outlet manifold portion 150. Each outlet submanifold 165 can include a first end 166 and a second end 167 opposite the first end. The first end 166 can be fluidly connected to the first tapered outlet manifold 145, and the second end 167 can be fluidly connected to the second tapered outlet manifold 150. Between the first and second ends (166, 167), each outlet submanifold 165 can have a tapered section 128.

A plurality of liquid passageways 130 can extend from the inlet submanifolds 125 to the outlet submanifolds 165. The liquid passageways 130 can each have an inner surface 131 and an outer surface 132. The inner surfaces 131 of the liquid passageways 130 can form an enclosed passageway that prevents the liquid from mixing with the air. During use of the heat exchanger 100, heat can be transferred from the liquid, through the walls of the liquid passageways, and to air flowing along the outer surfaces 132 of the liquid passageways 130.

To improve heat transfer from the first fluid (e.g. liquid) to the second fluid (e.g. gas), gas passageways 160 can extend along the liquid passageways 130 to permit parallel-flow or counter-flow of the first and second fluids within the heat exchanger 100. As shown in FIGS. 1, 14, and 15, the gas passageways 160 can be helical passageways extending along and around the liquid passageways 130. FIGS. 8 and 9 show an example of a fluid transfer member 175 having a liquid passageway 130 with a helical gas passageway 160 extending lengthwise through a center of the fluid transfer member and four helical gas passageways 160 extending lengthwise along and around the liquid passageway 130. The four helical gas passageways 160 can be formed by four helical fins 161 extending outward from and along the outer surface 132 of the liquid passageway. As gas (e.g. air) passes through the helical gas passageway 160, the gas can swirl, resulting in turbulent-like flow that greater enhances heat transfer rates. Computational analysis using fluid dynamics software revealed that the air-side heat transfer coefficient (a measure of the heat transfer performance) of the heat exchanger 100 tested in FIG. 33 was about two times higher with helical gas passageways 160 wrapping around the liquid passageways 130 than with straight gas passageways positioned beside the liquid passageways 130, with identical wall thicknesses 133. This is attributable to the turbulent-like flow and swirling flow within the helical gas passageways as well as longer residence times for the air as it flows through the helical passageways since they are longer than straight passageways. The superior performance of the polymer heat exchanger 100 over a similarly sized metal heat exchanger (see FIG. 33) can be largely attributed to the helical gas passageways 160 that wrap around the liquid passageways 130.

FIG. 10 shows a cross-sectional perspective view of a portion of the heat exchanger 100 revealing an array 180 of fluid transfer members 175 arranged into a block-like structure. The fluid transfer members 175 are stacked and interconnected vertically and horizontally to form an array 180 having suitable dimensions and performance characteristics for an intended application. The array 180 of fluid transfer members 175 can form a complex geometry that is well suited to 3D printing. In the array 180, neighboring fluid transfer members 175 can have helical fins arranged in opposing directions. For instance, a first fluid transfer member 175 can have a helical fin 175 oriented as shown in FIG. 8, but the fluid transfer members located immediately above, below, to the left, and to the right of the first fluid transfer member 175 in the array 180 can each have a helical fin oriented in the opposite direction. Conversely, fluid transfer members 175 positioned diagonally from the first fluid transfer member 175 in the array 180 can each have a helical fin 161 oriented in the same direction as the helical fin 161 of the first fluid transfer member. This arrangement allows the helical fins of adjacent fluid transfer members to form the complex geometry shown in detail in the cross-sectional views of FIGS. 17-25.

Figure 5:
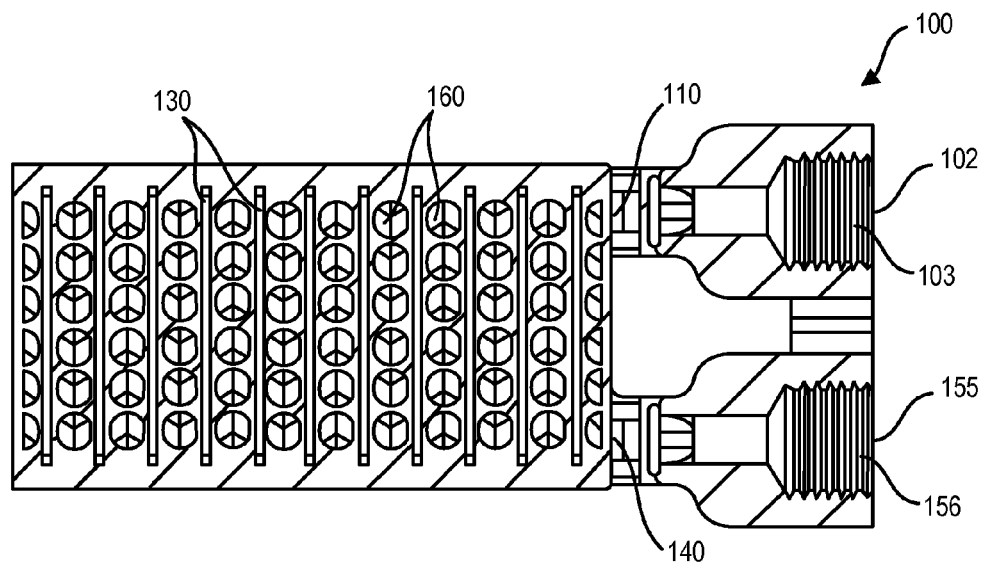
FIG. 5 shows a left side cross-sectional view of the heat exchanger of FIG. 4 taken along section A-A.

The cross-sectional view of FIG. 10 exposes an inlet submanifold 125 fluidly connected to an outlet submanifold 165 by a plurality of liquid passageways 130. Helical gas passageways 160 extend lengthwise along and around the liquid passageways 130. As a result of the location of the section taken along the right side of the array 180 in FIG. 10, the helical passageways 160 are bisected lengthwise, causing the helical gas passageways 160 to appear as a series of circular openings with contoured geometries located within the openings. Similarly, in FIG. 5, the helical passageways are bisected, causing the helical gas passageways 160 to appear as a series of circular openings with contoured geometries located within the openings. In FIG. 5, eleven liquid passageways 130 are bisected lengthwise, causing them to appear as slender vertical channels located between the circular openings of the helical gas passageways 160.

In FIG. 10, the helical gas passageways 160 enter on the side of the array 180 labeled "gas inlet" and exit on the side of the array labeled "gas outlet." Liquid is provided to the liquid passageways 130 from the inlet submanifold 125. Liquid is shown entering the inlet submanifold from the top of the array and the bottom of the array. Liquid entering from the top of the array 180 arrives via the first tapered inlet manifold portion 115, which is not shown in FIG. 10 but is shown in FIG. 11. Liquid entering from the bottom of the array 175 arrives via the second tapered inlet manifold portion 120, which is not shown in FIG. 10 but is shown in FIG. 1.

Figure 2:
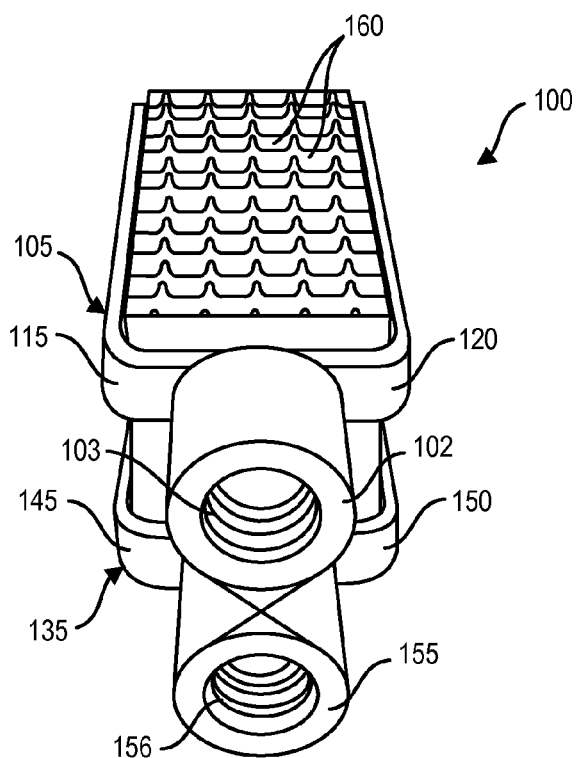
FIG. 2 shows a front perspective view of the heat exchanger of FIG. 1.
Figure 3:
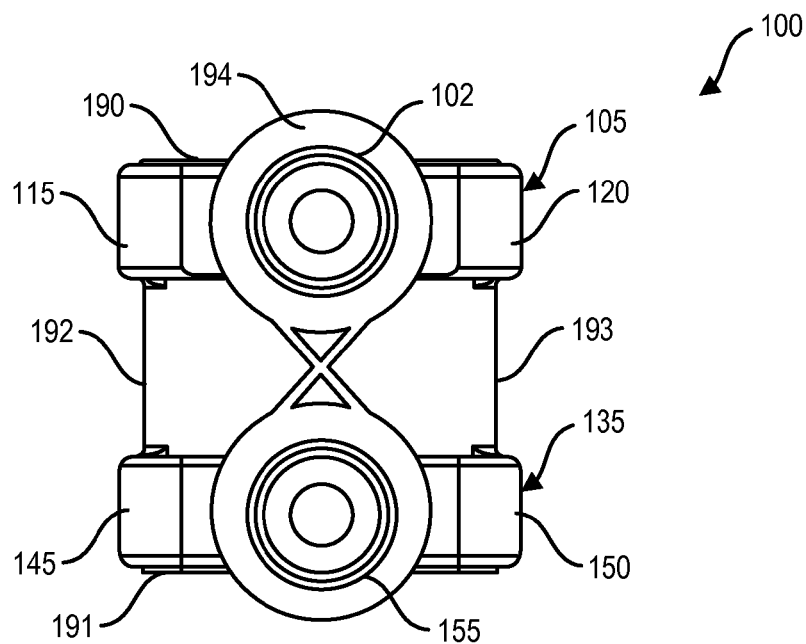
FIG. 3 shows a front view of a heat exchanger of FIG. 1.

FIG. 2 shows a front perspective view of the heat exchanger 100. The front side of the heat exchanger 100 includes a main liquid inlet 102 and a main liquid outlet 155. The main liquid inlet 102 can include threads 103 to permit connecting the main liquid inlet to a liquid supply line. Similarly, the main liquid outlet 155 can include threads 156 to permit connecting the main liquid outlet to a liquid discharge line. In other examples, threaded connections can be replaced with other suitable connections, including quick-connect fittings, compression fittings, adhesives, seals, or hose clamps, that allow the heat exchanger to be fluidly connected to a product or process.

Figure 7:
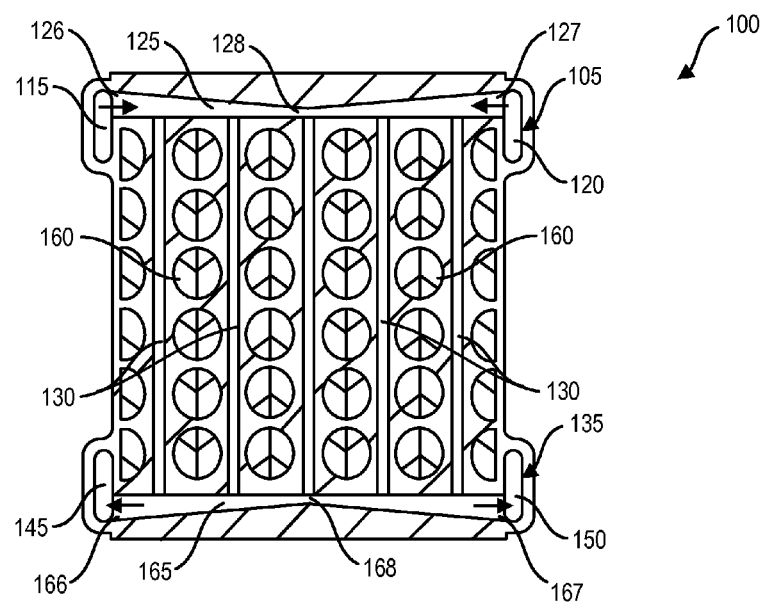
FIG. 7 shows a front cross-sectional view of the heat exchanger of FIG. 6 taken along section B-B.

FIG. 7 shows a front cross-sectional view of the heat exchanger 100 of FIG. 6 taken along section B-B. The first and second tapered inlet manifold portions (115, 120) appear as ovals near the upper left and right corners, respectively, of the heat exchanger 100. The inlet submanifold 125 extends horizontally between the first tapered inlet manifold portion 115 and the second tapered inlet manifold portion 120. The inlet submanifold 125 includes a first end 126 fluidly connected to the first tapered inlet manifold portion 115, a second end 127 fluidly connected to the second tapered inlet manifold portion 120, and a tapered section 128 near a midpoint of the inlet submanifold. The inlet submanifold 125 shown in FIG. 7 is fluidly connected to five liquid passageways arranged vertically within the heat exchanger. The tapered section 128, or waist, of the inlet submanifold 125 can provide uniform, or near uniform distribution of liquid flow from the inlet submanifold 125 to each of the liquid passageways 130. The liquid passageways 130 can fluidly connect the inlet submanifold 125 to the outlet submanifold 165. The outlet submanifold 165 can include a first end 166 fluidly connected to the first tapered outlet manifold portion 145, a second end 167 fluidly connected to the second tapered outlet manifold portion 150, and a central tapered section 168, or waist, located near its midpoint. The helical gas passageways 160 that wrap around the liquid passageways are bisected in FIG. 7, causing them to appear as columns of circular openings beside the liquid passageways.

FIG. 8 shows a fluid transfer member 175 of the heat exchanger of FIG. 1. FIG. 9 shows a lengthwise cross-sectional perspective view of the fluid transfer member 175 of FIG. 8. The fluid transfer member has a liquid passageway 130 extending lengthwise through the center of the fluid transfer member 175 from an inlet submanifold 125 to an outlet submanifold 165. The fluid transfer member 175 also includes four helical gas passageways 160 extending along and around the liquid passageway 130. The four helical gas passageways 160 are formed by four helical fins 161 extending outward from and along an outer surface 132 of the liquid passageway.

FIG. 28A shows one quarter of a cross-sectional end view of the fluid transfer member 175 of FIG. 8 taken near the midpoint of the fluid transfer member. FIG. 28A shows one quarter of a liquid passageway 130 and halves of two fins 161 extending from an outer surface 132 of the wall of the liquid passageway. FIG. 28A shows temperature gradients within the fins based on finite element analysis performed on a computer. In the analysis, a certain liquid flow rate was provided through the liquid passageway 130, and a certain air flow rate was provided through the helical gas passageways 160. The temperature is greatest proximate the inner surface 131 and least at the tips of the fins 161. The superior performance of the fluid transfer member 175 shown in FIG. 28B is partially attributable to multiple liquid passageways and partially attributable to helical grooves 162. As can be seen in FIG. 28B, the combination of these two features results in the liquid passageways being physically closer to the tips of the fins 161, which reduces thermal resistance and allows the fins to reach higher temperatures, thereby increasing heat transfer to the gas.

FIG. 11 and show simplified perspective view of the heat exchanger of FIG. 1. The simplified views omit the helical gas passageways 160 to allow a liquid pathway from the main liquid inlet 102 to a main liquid outlet 155 to be clearly shown. From the main liquid inlet 102 to the main liquid outlet 155, the liquid pathway includes a liquid inlet 120 leading to a dual tapered inlet manifold 105, a plurality of inlet submanifolds 125, a plurality of liquid passageways 130, a plurality of outlet submanifolds 165, a dual tapered outlet manifold 135, and a liquid outlet configured to discharge liquid to the main liquid outlet 155.

FIG. 13 shows a simplified left side view of the heat exchanger of FIG. 1. The simplified view omits the helical gas passageways 160 to allow the liquid pathway from the main inlet 102 to a main outlet 155 to be clearly shown. FIG. 13 shows profile views of the first tapered inlet manifold portion 115 and the first tapered outlet manifold portion 145. The tapered manifold portions (115, 145) extend approximately the length of the array 180 of fluid transfer members 175. From maximum to minimum cross-sectional areas, the tapered manifold portions (115, 120, 145, 150) taper from full cross-sectional area near to about 10-20 percent of full cross sectional area near the rear of the heat exchanger 100. The tapered shapes of the tapered inlet manifold portions (115, 120) can provide even flow distribution to the plurality of inlet submanifolds 125. The tapered shapes of the tapered outlet manifold portions (145, 150) can reduce the pressure drop of the liquid through the heat exchanger 100, thereby reducing the pump power needed to circulate liquid through the heat exchanger.

FIG. 14 shows a simplified rear end view of the heat exchanger 100 of FIG. 1, and and FIG. 15 shows a simplified left side view of the heat exchanger of FIG. 1. The simplified views show helical gas passageways 160 extending through the heat exchanger 100. The helical gas passageways 160 extend from the bottom 191 of the heat exchanger 100 to the top 190 of the heat exchanger. Each helical gas passageway 160 wraps around an outer surface of a liquid passageway 130. When the heat exchanger 100 is used to cool a hot liquid, cool air flows into the heat exchanger through a helical gas passageway 160 located on the bottom 191 of the heat exchanger 100. As the air flows through the helical gas passageway 160, it flows in a helical pathway wrapping around and extending along the length of the liquid passageway 130. As the cool air flows through the helical gas passageway 160, it absorbs heat from the outer surface 132 of the wall of the liquid passageway 130 and from helical fins 161 bounding the helical gas passageway 160. Due to the helical nature of the gas passageway, the air may experience turbulent or turbulent-like flow through the helical gas passageway, thereby increasing the heat transfer rate from the hot liquid to the air. As a result of heat transfer occurring within the heat exchanger 100, the air will exit the heat exchanger at a higher temperature than when it entered and the liquid will exit the heat exchanger at a lower temperature than when it entered.

FIG. 16 shows a left side view of the heat exchanger 100 of FIG. 1. In FIG. 16, sections C-C through K-K are shown. Section C-C is parallel to the top surface 190 of the heat exchanger and bisects the main liquid inlet 102. Each subsequent section is parallel to and spaced 1 mm inward (i.e. toward a center of the heat exchanger) from the section immediately preceding it alphabetically. Consequently, section D-D is spaced 1 mm inward from section C-C, section E-E is spaced 2 mm inward from section C-C, section F-F is spaced 3 mm inward from section C-C, section G-G is spaced 4 mm inward from section C-C, section H-H is spaced 5 mm inward from section C-C, section I-I is spaced 6 mm inward from section C-C, section J-J is spaced 7 mm inward from section C-C, and section K-K is spaced 8 mm inward from section C-C.

FIGS. 17-25 shows a series of cross-sectional views of the heat exchanger 100 taken along sections C-C through K-K of FIG. 16. The series of cross-sectional views allow the changing geometry of the helical gas passageways 160 to be observed as they spiral through the heat exchanger 100 and around the liquid passageways 130. In the examples shown in FIGS. 17-25, a first fin 161-1 undergoes a rotation of about 135 degrees over a distance of about 8 mm, indicating that a full rotation of 365 degrees will occur over a distance of about 21.3 mm. The length of the helical passageways 160 in FIG. 1 is about 32 mm in length, resulting in about 1.5 rotations of the helical gas passageways 160-1 around the liquid passageway 130-1. In other examples, the helical gas passageways 160 can rotate around the liquid passageways fewer or more than 1.5 times. For example, the helical gas passageways 160 can rotate around the liquid passageways 0.5-1.5, 1.0-2.0, 1.5-2.5, 2.0-3.0, or more than 2.5 times. The number of rotations of the helical gas passageways 160 around the liquid passageways 130, and the pitch of the helical gas passageways, can vary depending on design constraints (e.g. heat exchanger size, allowable pressure drop, pump flow rate, and fan flow rate) and performance requirements (e.g. rate of heat transfer and efficiency requirements).

FIG. 17 shows a first helical gas passageway 160-1 bounded by a first helical fin 161-1 associated with a first fluid transfer member 175-1, a second helical fin 161-2 associated with the first fluid transfer member 175-1, and two helical fins (161-3, 161-4) associated with a neighboring fluid transfer member (175-2). The first helical gas passageway 160-1, and the other three helical gas passageways associated with the first fluid transfer member 175-1, can rotate in a counterclockwise direction around a liquid passageway 130-1, as viewed in FIGS. 17-25. By contrast, helical gas passageways 160 associated with fluid transfer members that are adjacent to the first fluid transfer member 175-1 rotate in clockwise directions around their respective liquid passageways 130 as viewed in FIGS. 17-25. Fluid transfer members 175 that are positioned diagonally from the first fluid transfer member 175-1 can have helical gas passageways that rotate in clockwise directions around their respective liquid passageways 130 as viewed in FIGS. 17-25. A variation of this arrangement is shown in FIG. 32, where a first fluid transfer member 175-1 has helical fins 161 and helical gas passageways 160 that wrap counterclockwise (CCW) around a liquid passageway formed in the first fluid transfer member. Within the array of fluid transfer members 180 (i.e. the structure), a third fluid transfer member 175-3 is positioned diagonally (right and down) from the first fluid transfer member 175-1, and also includes helical fins 161 and helical gas passageways 160 that wrap counterclockwise around a liquid passageway formed in the third fluid transfer member. By contrast, the fluid transfer members that are adjacent to the first fluid transfer member, designated as 175-2 and 175-4 in FIG. 32, have helical fins 161 and helical gas passageways 160 that wrap clockwise around their respective liquid passageways 130.

The helical gas passageways 160 can have non-uniform cross-sectional shapes and areas along their lengths to promote turbulent or turbulent-like flow, thereby enhancing heat transfer from a liquid to a gas flowing through the heat exchanger. For example, as shown in FIGS. 17-25, the first helical gas passageway 160-1 can have varying cross-sectional shapes along its length, including teardrop, dual teardrop, nearly rectangular, nearly square, and a variety of transitional shapes. An example of this variation can be observed by comparing the cross-sectional area of the first helical gas passageway 160-1 shown in FIG. 17 against the cross-sectional area of the same helical gas passageway in FIG. 25, which is about twice as large. During operation of the heat exchanger, variations in the cross-sectional area of the helical gas passageway produces variations in air flow velocity through the passageway, which can promote turbulent or turbulent-like flow that can disrupt boundary layers along the wall of the gas passageway and enhance heat transfer. The cross-sectional area can increase and decrease in cross-sectional area repeatedly along the length of the gas passageway.

Along its length, the helical gas passageway 160 can merge with and then separate from one or more helical gas passageways associated with neighboring fluid transfer members 175. For example, as shown in FIG. 17, the first helical gas passageway 160-1 merges with a helical gas passageway associated with a fluid transfer member 175 to its left. In FIG. 18, the first helical gas passageway 160-1 merges with a helical gas passageway associated with a fluid transfer member to its left, a helical gas passageway associated with a fluid transfer member below it, and a helical gas passageway associated with a fluid transfer member diagonal (down and left) from it. In FIGS. 19-21, the first helical gas passageway 160-1 merges with a helical gas passageway associated with a fluid transfer member to its left, a helical gas passageway associated with a fluid transfer member below it, and a helical gas passageway associated with a fluid transfer member diagonal (down and left) from it. In FIG. 22, the first helical gas passageway 160-1 merges with a helical gas passageway associated with a fluid transfer member below it. In FIGS. 23-25, the first helical gas passageway 160-1 merges with a helical gas passageway associated with a fluid transfer member to its right, a helical gas passageway associated with a fluid transfer member below it, and a helical gas passageway associated with a fluid transfer member diagonal (down and right) from it. Additional cross-sectional views, if provided, would show that, as the first helical gas passageway 160-1 continues to rotate counterclockwise around and along the length of the liquid passageway 130, it merges with and then separates from neighboring helical gas passageways in a counterclockwise fashion. This sequential intermingling of gas streams flowing through neighboring helical gas passageways enhances uniformity of heat transfer within the heat exchanger 100 and promotes turbulent flow, which can enhance overall performance of the heat exchanger.

Mergers between adjacent helical gas passageways 160 can be relatively short in length compared to the overall length of the helical gas passageways. For example, a merger between the first helical gas passageway 160-1 and the helical gas passageway 160-2 that is immediately above the first helical gas passageway 160-1 in FIG. 17 extends only about 5 mm in length along the passageways before the passageways completely separate, as shown in FIG. 22. In some examples, the merger can be 3-10, 5-15, or 10-20 mm in length for a heat exchanger 100 sized for cooling a personal computer 400. For larger heat exchangers, the merger length can be longer, such as 5-15, 10-25, or 20-35% of a length of a helical gas passageways.

FIG. 26 shows a fluid transfer member 175 having four liquid passageways 130 extending lengthwise through a center region of the fluid transfer member. Four helical gas passageways 160 extend along and around the grouping of four liquid passageways 130. Similarly, eight helical grooves 162 extend along and around the four liquid passageways 130. The helical gas passageways 160 are partially defined by four helical fins 161 extending outward from and along an outer surface fluid transfer member 175. The fluid transfer member 175 shown in FIG. 26 can have any suitable dimensions depending on the application. In one example, the fluid transfer member 175 can have a width of about 4-8 mm, a height of about 4-8 mm, and a length of about 25-35 mm. Although four liquid passageways are shown in FIG. 26, this is not limiting. The fluid transfer member 175 can have one, two, three, four, or more than four liquid passageways 130. In some examples, the liquid passageways 130 can merge and separate from adjacent liquid passageways and in other examples the liquid passageways may not merge with adjacent liquid passageways.

FIG. 27 shows a fluid transfer member 175 having a liquid passageway 130 (shown in FIG. 28C) extending lengthwise through a center region of the fluid transfer member 175. Eight helical gas passageways 160 extending along and around the liquid passageway 130. The eight helical gas passageways 160 are partially defined by eight helical fins 161 extending outward from and along an outer surface of the fluid transfer member 175. The fluid transfer member 175 shown in FIG. 26 can have any suitable dimensions depending on the application. In one example, the fluid transfer member 175 can have a width of about 4-8 mm, a height of about 4-8 mm, and a length of about 25-35 mm.

FIG. 28A shows a cross-sectional quarter view of the fluid transfer member of FIG. 8, FIG. 28B shows a cross-sectional quarter view of the fluid transfer member of FIG. 26, and FIG. 28C shows a cross-sectional quarter view of the fluid transfer member of FIG. 27. FIGS. 28A, 28B, and 28C show results obtained using finite element heat transfer analysis software. In the simulation, a water temperature of 40 degrees C. and an air temperature of 20 degrees C. were input. The fins 161 in FIG. 28B exhibited the best performance with temperatures near 35 degrees C. at the tips of the fins. The fins 161 in FIG. 28C provided the second best performance with temperatures near 27 degrees C. at the tips of the fins. The fins 161 in FIG. 28A provided the third best performance with temperatures near 23 degrees C. at the tips of the fins.

FIG. 31 shows a perspective view of a portion of the heat exchanger 100 of FIG. 1 having a stacked array 180 of nine interconnected fluid transfer members 175. In the example shown in FIG. 31, the fluid transfer members 175 each include four helical fins 161 extending outward from and along the length of an outer surface 131 of a wall of the liquid passageway 130 (as shown in FIG. 9). The orientation (clockwise versus counterclockwise) of the helical fins 161 is opposite on neighboring fluid transfer members 175. For instance, the helical fins 161 on the fluid transfer member located in the top right position in the array of FIG. 31 is counterclockwise, whereas the helical fins on the fluid transfer members immediately adjacent to that fluid transfer member are clockwise. The fluid transfer member 175 located in the middle of the array 180 (and diagonal from the top right fluid transfer member) has helical fins arranged in a counterclockwise, like the helical fins on the fluid transfer member located in the top right position. Consequently, the resulting helical fin pattern is that fluid transfer members immediately adjacent (i.e. immediately above, below, left, and right) to a fluid transfer member have opposing fin orientations, and fluid transfer members that are immediately diagonal from the fluid transfer member have corresponding fin orientations.

FIG. 32 shows a perspective view of a portion of the heat exchanger having a stacked array 180 of four interconnected fluid transfer members 175 similar to the one shown in FIG. 26. Each fluid transfer member 175 has four liquid passageways 130 extending lengthwise through a center of the member. The fluid transfer members 175 in the upper right and lower left positions in the array have clockwise helical fin orientations, and the fluid transfer members in the upper left and lower right have counterclockwise helical fin orientations. The fins on adjacent fluid transfer members meet along their tips to form a seamless structure. The array in FIG. 32 is well suited to 3D printing due to its complexity, including thin sections where neighboring fins meet and small, detailed liquid and gas passageways.

The quantity and arrangement of interconnected fluid transfer member 175 can vary depending upon the application. FIG. 32 shows a stacked array with four interconnected fluid transfer members, FIG. 31 shows a stacked array with nine interconnected fluid transfer members, and FIG. 10 shows a stacked array of more than 35 interconnected fluid transfer members. In other examples, the stacked array can include more or fewer interconnected fluid transfer members. In space-constrained examples, such as in laptop computers or mobile communication devices, it may be desirable to arrange a single row of interconnected fluid transfer members 175 to ensure a low profile that can be easily packaged into a device having a cooling system 1.

The heat exchanger 100 shown in FIG. 1 was manufactured using a commercial 3D printer. A series of experiments were conducted to evaluate the performance of the heat exchanger 100. During testing, the heat exchanger 100 was evaluated against a model NexXxos XT45 Full Copper Dual 40 mm Radiator from Alphacool International GmbH, headquartered in Germany. The NexXxos XT45 (the "reference heat exchanger") is a compact, high-performance radiator designed to remove heat from liquid circulating through electronics. The heat exchanger 100 was designed and printed to have similar dimensions as the reference heat exchanger to provide a fair comparison. The reference heat exchanger weighed about 189 grams, whereas the polymer heat exchanger weighed only 75 grams, a weight savings of over 50%. The weight difference was even more dramatic when the heat exchangers were filled with water, since the polymer heat exchanger 100 has a far smaller liquid volume than the reference heat exchanger and, consequently, a significantly lower operating weight.

A wind tunnel was used to evaluate the heat exchangers. A schematic of the experimental setup is provided in FIG. 29. The wind tunnel was instrumented with thermocouples and pressure sensors, which were electrically connected to a data acquisition system, as shown in FIG. 30. The heat exchanger 100 was positioned within the wind tunnel, and thermocouples were placed upstream and downstream of the heat exchanger within the wind tunnel to measure the change in air temperature across the heat exchanger. A water supply line and discharge line were fluidly connected to the main liquid inlet 102 and main liquid outlet 155, respectively. A variable speed diaphragm pump was used to provide 40 degree C. water at a constant flow rate from a heated water bath to the heat exchanger 100. A central air source was fed through a gas mass flow controller and to an inlet of the wind tunnel. The cross-section of the wind tunnel was lofted over a distance of 150 mm from its inlet to a middle section where the heat exchanger 100 was located. Beyond the heat exchanger 100, the wind tunnel maintained a constant cross-sectional area for 100 mm to avoid expansion of the air flow and thereby permit temperature and pressure readings to be accurately recorded. The static air pressure drop across the heat exchanger 100 was measured with a manometer. A list of specific equipment used in the experiments is provided in Table 2.

TABLE 2

Experimental Test Equipment

| Component | Make | Model | Uncertainty |
|---|---|---|---|
| Data acquisition | Agilent Technologies | 34980A | 0.09% |
| Flow transmitter | Micro Motion | RFT9739 | 0.15% |
| Mass flow meter | Micro Motion | F025SR3198U | 0.10% |
| Diaphragm pump | SHURflo | 74520-00 | N/A |
| Heating bath | Cole-Parmer | Digital Polystar | 0.05 deg. C. |
| Mass flow control | Cole-Parmer | 32907-81 | 0.1% FS |
| Air pressure transducer | Omega | PX154-0001D1 | 0.01 in. H$_2$O |

Experimental test results for the heat exchanger 100 are provided in Table 3. The heat exchangers were tested across a range of air and water flow rates. The air was provided at a temperature of about 20 degrees C., and the water was provided at a temperature of about 40 degrees C. FIG. 33 shows thermal conductance (W/K) versus air flow (SLPM) data for the polymer heat exchanger 100 and the reference metal heat exchanger for a water flow rate of 1.6 liters per minute at 40 degrees C. and a range of air flow rates. Thermal conductance (UA) represents performance of the heat exchanger and is calculated as the product of overall conductance (U) and the surface area (A) through which heat is conducted. The helical gas passageways 160 provide a very large surface area (A), which increases thermal conductance. The polymer heat exchanger 100 outperformed the reference metal heat exchanger across the entire range of air flow rates by a considerable margin.

TABLE 3

Experimental Test Results

| Trial Label | Air Flow (SLPM) | Water Flow (LPM) | $T_a$ | $T_w$ | $Q_{avg}$ | UA | NTU | ϵ |
|---|---|---|---|---|---|---|---|---|
| v3 40 122 0.4 A | 122 | 0.4 | | | | | | |
| v3 40 122 0.4 B | 122 | 0.4 | 24.85 | 38.46 | 23.48 | 1.726 | 0.7042 | 0.5299 |
| v3 40 122 0.8 A | 122 | 0.8 | 24.9 | 39.7 | 21.82 | 1.474 | 0.6013 | 0.4607 |
| v3 40 122 0.8 B | 122 | 0.8 | 24.97 | 39.64 | 23.45 | 1.6 | 0.6525 | 0.499 |
| v3 40 122 1.6 A | 122 | 1.6 | 24.61 | 40.18 | 21.73 | 1.396 | 0.5695 | 0.4411 |
| v3 40 243 0.4 A | 243 | 0.4 | 23.34 | 38.41 | 29.62 | 1.964 | 0.4022 | 0.3286 |
| v3 40 243 0.4 B | 243 | 0.4 | 23.33 | 38.33 | 30.45 | 2.03 | 0.4158 | 0.3388 |
| v3 40 243 0.8 A | 243 | 0.8 | 23.45 | 39.52 | 30.77 | 1.915 | 0.3921 | 0.3256 |
| v3 40 243 0.8 B | 243 | 0.8 | 23.47 | 39.54 | 30.68 | 1.91 | 0.3912 | 0.3248 |
| v3 40 243 1.6 A | 243 | 1.6 | 23.4 | 40.17 | 28.57 | 1.703 | 0.3489 | 0.292 |
| v3 40 243 1.6 B | 243 | 1.6 | 23.46 | 40.17 | 29.41 | 1.76 | 0.3604 | 0.3016 |
| v3 40 486 0.4 A | 486 | 0.4 | 22 | 38.21 | 35.74 | 2.205 | 0.2258 | 0.1967 |
| v3 40 486 0.4 B | 486 | 0.4 | 21.9 | 38.2 | 36.12 | 2.217 | 0.227 | 0.1977 |
| v3 40 486 0.8 A | 486 | 0.8 | 21.87 | 39.36 | 38.73 | 2.214 | 0.2267 | 0.2013 |
| v3 40 486 0.8 B | 486 | 0.8 | 21.82 | 39.42 | 38.03 | 2.161 | 0.2212 | 0.1967 |
| v3 40 486 1.6 A | 486 | 1.6 | 21.9 | 40.11 | 36.31 | 1.993 | 0.2041 | 0.183 |
| v3 40 486 1.6 B | 486 | 1.6 | 21.88 | 40.14 | 36.14 | 1.979 | 0.2027 | 0.1818 |
| v3 40 972 0.4 A | 972 | 0.4 | 20.47 | 38.36 | 39.91 | 2.232 | 0.1143 | 0.1041 |
| v3 40 972 0.4 B | 972 | 0.4 | 20.44 | 38.01 | 43.15 | 2.457 | 0.1258 | 0.1137 |
| v3 40 972 0.4 C | 972 | 0.4 | 20.69 | 38.09 | 41.88 | 2.406 | 0.1232 | 0.1116 |
| v3 40 972 0.78 | 972 | 0.78 | 20.56 | 39.24 | 46.01 | 2.463 | 0.1261 | 0.1164 |
| v3 40 972 1.6 A | 972 | 1.6 | 20.65 | 39.99 | 47.27 | 2.443 | 0.1251 | 0.1168 |
| v3 40 972 1.6 B | 972 | 1.6 | 20.69 | 40.08 | 44.5 | 2.295 | 0.1175 | 0.1098 |

FIG. 34 shows the heat exchanger 100 installed in a computer 400, such as a server, personal computer, or high-performance computing (HPC) cluster. The computer 400 can include a motherboard 405 with microprocessors 410 and memory modules 420 electrically connected to the motherboard. The heat exchanger 100 can be fluidly connected to a cooling system, such as any of the cooling systems disclosed in U.S. patent application Ser. No. 14/826, 822 filed on Aug. 14, 2015 and titled "Manifold for a Cooling System," which is hereby incorporated by reference in its entirety. The cooling system 1 can circulate a flow of coolant 51, such as a dielectric coolant, through one or more heat sink modules 200 mounted on microprocessors 410. During operation of the computer 400, heat generated by the operating microprocessors 410 is absorbed into the coolant as it flows through heat sink modules 200 mounted on the microprocessors. To reject the absorbed heat from the coolant, the flow of coolant 51 can be routed through the heat exchanger 100, as shown in FIG. 34. One or more fans 26 can be mounted to a surface of the heat exchanger 100, such as a bottom surface 191 of the heat exchanger 100, to provide a counter-flow of air through the helical gas passageways 160 of the heat exchanger. As air is forced through the helical gas passageways 160 by the fan 26, the air can absorb heat from the coolant, which is counter-flowing through the liquid passageways 130 in the heat exchanger. The hot air can be expelled from the computer housing 425 through vents or openings in the housing, as shown in FIG. 34, and cool air can flow into the housing to replace the expelled hot air, thereby providing air flow through the housing 425 over the other components, which can provide useful cooling for the motherboard 405, memory modules 420, and other computer components.

The heat exchanger 100 can be compatible with water and a wide variety of dielectric coolants, such as 1,1,1,3,3-pentafluoropropane (known as R-245fa), hydrofluoroether (HFE), 1-methoxyheptafluoropropane (known as HFE-7000), methoxy-nonafluorobutane (known as HFE-7100). One version of R-245fa is commercially available as GENETRON 245fa from Honeywell International Inc. headquartered in Morristown, N.J. HFE-7000 and HFE-7100 (as well as HFE-7200, HFE-7300, HFE-7500, HFE-7500, and HFE-7600) are commercially available as NOVEC Engineered Fluids from 3M Company headquartered in Mapleton, Minn. FC-40, FC-43, FC-72, FC-84, FC-770, FC-3283, and FC-3284 are commercially available as FLUOROINERT Electronic Liquids also from 3M Company.

GENETRON 245fa is a pentafluoropropane and has a boiling point of 58.8 degrees F. (−14.9 degrees C.) at 1 atm, a molecular weight of 134.0, a critical temperature of 309.3 degrees F., a critical pressure of 529.5 psia, a saturated liquid density of 82.7 lb/ft3 at 86 degrees F., a specific heat of liquid of 0.32 Btu/lb-deg F. at 86 degrees F., and a specific heat of vapor of 0.22 btu/lb-deg F. at 1 atm and 86 degrees F. GENETRON 245fa has a Safety Group Classification of A1 under ANSI/ASHRAE Standard 36-1992.

NOVEC 7000 has a boiling point of 34 degrees C., a molecular weight of 200 g/mol, a critical temperature of 165 degrees C., a critical pressure of 2.48 MPa, a vapor pressure of 65 kPa, a heat of vaporization of 142 kJ/kg, a liquid density of 1400 kg/m3, a specific heat of 1300 J/kg-K, a thermal conductivity of 0.075 W/m-K, and a dielectric strength of about 40 kV for a 0.1 inch gap.

NOVEC 7100 has a boiling point of 61 degrees C., a molecular weight of 250 g/mol, a critical temperature of 195 degrees C., a critical pressure of 2.23 MPa, a vapor pressure of 27 kPa, a heat of vaporization of 112 kJ/kg, a liquid density of 1510 kg/m3, a specific heat of 1183 J/kg-K, a thermal conductivity of 0.069 W/m-K, and a dielectric strength of about 40 kV for a 0.1 inch gap.

NOVEC 649 Engineered Fluid is also available from 3M Company. It is a fluoroketone fluid ($C_6$-fluoroketone) with a low Global Warming Potential (GWP). It has a boiling point of 49 degrees C., a thermal conductivity of 0.059, a molecular weight of 316 g/mol, a critical temperature of 169 degrees C., a critical pressure of 1.88 MPa, a vapor pressure of 40 kPa, a heat of vaporization of 88 kJ/kg, and a liquid density of 1600 kg/m3.

As shown in FIGS. 1 and 11-13, a heat exchanger 100 can include a dual tapered inlet manifold 105 having a liquid inlet 110 configured to receive a liquid, a first tapered inlet manifold portion 115 fluidly connected to the liquid inlet and tapering in cross-sectional area in a direction away from the liquid inlet, and a second tapered inlet manifold portion 120 fluidly connected to the liquid inlet and tapering in a direction away from the liquid inlet. The heat exchanger 100 can include a first plurality of submanifolds 125 fluidly connecting the first tapered inlet manifold portion 115 to the second tapered inlet manifold portion 120. The heat exchanger 100 can include a plurality of liquid passageways 130 fluidly connecting the first plurality of submanifolds 125 to a second plurality of submanifolds 165. The heat exchanger 100 can include a dual tapered outlet manifold 135 including a liquid outlet 140 configured to discharge liquid, a first tapered outlet manifold portion 145 fluidly connected to the liquid outlet and tapering in cross-sectional area in a direction away from the liquid outlet, and a second tapered outlet manifold portion 150 fluidly connected to the liquid outlet and tapering in a direction away from the liquid outlet. The second plurality of submanifolds 165 can fluidly connect the first tapered outlet manifold portion 145 to the second tapered outlet manifold portion 150.

The heat exchanger 100 can include a plurality of helical gas passageways 160 extending from a first side 191 of the heat exchanger to a second side 190 of the heat exchanger. A first helical gas passageway 160 of the plurality of gas passageways can extend along and around a first outer surface of a first liquid passageway 130 of the plurality of liquid passageways. As shown in FIG. 17, the first helical gas passageway 160 can be bounded at least in part by a first helical fin 161-1 protruding from and extending along and around the first outer surface 132 of the first liquid passageway 130-1 and by a second helical fin 161-2 protruding from and extending along and around the first outer surface 132 of the first liquid passageway 130-1. Along at least a portion of the first helical gas passageway 160, the first helical gas passageway 160 can also bounded by a third helical fin 161-3 protruding from and extending along and around a second outer surface 130-2 of a second liquid passageway 130. A first tip 181 of the first helical fin can mate with a third tip 181 of the third helical fin along at least a portion (e.g. a mating region 164 as depicted in FIG. 31) of the first helical gas passageway 160. Along at least a portion of the first helical gas passageway 160, the first helical gas passageway can be bounded by a fourth helical fin 161-4 protruding from and extending along and around the second outer surface of the second liquid passageway 130-2. A second tip 181 of the second helical fin 161-2 can mate with a fourth tip 181 of the fourth helical fin 161-4 along at least a portion of the first helical gas passageway 160.

Along at least a portion of the first helical gas passageway 160, the first helical gas passageway can be bounded by a fifth helical fin 161-4 protruding from and extending along and around a third outer surface of a third liquid passageway 130-3, as shown in FIG. 21. The second tip 181 of the second helical fin 161-2 can mate with a fifth tip 181 of the fifth helical fin 161-5 along at least a portion of the first helical gas passageway 160-1, as shown in FIG. 25. Along at least a portion of the first helical gas passageway 160, the first helical gas passageway can be bounded by a sixth helical fin 161-6 protruding from and extending along and around a fourth outer surface of a fourth liquid passageway 130-4, as shown in FIG. 25. The first tip 181 of the first helical fin 161-1 can mate with a sixth tip 181 of the sixth helical fin 161-6 along at least a portion of the first helical gas passageway 160-1.

The first plurality of submanifolds 125 can each include a first end 126 fluidly connected to the first tapered inlet manifold portion 115, a second end 127 fluidly connected to the second tapered inlet manifold portion 120, and a tapered section 128 located between the first end and the second end. The second plurality of submanifolds 165 each can include a first end 166 fluidly connected to the first outlet manifold portion 145, a second end 167 fluidly connected to the second outlet manifold portion 150, and a tapered section 168 located between the first end and the second end (166, 167).

The heat exchanger 100 can include a main liquid inlet 102 fluidly connected to the liquid inlet 110 and a main liquid outlet 155 fluidly connected to the liquid outlet 140. The main liquid outlet 140 can include a first connection 103 feature for fluidly connecting the heat exchanger to a liquid supply line. The main liquid outlet 155 can include a second connection feature 156 for fluidly connecting the heat exchanger to a liquid discharge line.

The first helical passageway 160 can rotate (i.e. wrap) around the first liquid passageway 130 about 0.5-1.0, 0.75-1.5, 1.25-2, 1.5-3, 2-4, or more than 3 times over a length of the first liquid passageway. The first liquid passageway can have a diameter of about 0.02-0.04, 0.03-0.05, 0.04-0.06, 0.05-0.07, or 0.06-0.08 inches. The first liquid passageway can have a cross-sectional area of about 0.0003-0.002, 0.001-0.003, 0.002-0.005, or greater than 0.005 square inches. The first liquid passageway can be made of a material with a thermal conductivity less than 10, 5, 2, or 0.5 W/m-k.

The heat exchanger 100 can be 3D-printed using a printable material such as a polymer, polymer-ceramic composite, polymer-metal composite, metal composite, metal alloy, or metal. Consequently, the first helical passageway 160-1 and the first liquid passageway 130-1 can be formed by additive manufacturing. In some examples, the heat exchanger 100 can have a height of about 30-50 mm and a width of about 30-50 mm. The heat exchanger 100 can have a volume of about 55-60 cubic centimeters and a mass less than 75, 85, or 100 grams. The heat exchanger 100 can have a density less than about 1.4, 1.3, or 1.2 grams per cubic centimeter and can have a thermal conductance greater than 2, 3, or 4 W/K.

The first helical fin 160 can be tapered, meaning that it is thinner at the first tip 181 than at its base. The first helical fin 161 can include one or more protrusions extending into the first helical gas passageway 160. The one or more protrusions can promote turbulence within the gas flowing through the first helical gas passageway during use. The protrusions can be mini or micro-sized protrusions. The protrusions can trip the gas flow or otherwise prevent a boundary layer from forming on a portion of the first helical fin.

A heat exchanger 100 can include an inlet manifold 105 having a liquid inlet 110 configured to receive a liquid, a first inlet manifold portion 115 fluidly connected to the liquid inlet, and a second inlet manifold portion 120 fluidly connected to the liquid inlet. The heat exchanger 100 can include a plurality of fluid transfer members 175 forming an array 180 of interconnected fluid transfer members. Each fluid transfer member 175 can include a liquid passageway 130 extending lengthwise through a center portion of the fluid transfer member and at least four fins 161 extending outward from and along an outer surface 132 of a wall of the liquid passageway 130 of the fluid transfer member. The heat exchanger 100 can include a first plurality of submanifolds 125 fluidly connecting the first inlet manifold portion 115 to the second inlet manifold portion 120. The heat exchanger 100 can include a plurality of liquid passageways 130 fluidly connecting the first plurality of submanifolds 125 to a second plurality of submanifolds 165. The heat exchanger 100 can include an outlet manifold 135 having a liquid outlet 140 configured to discharge liquid, a first outlet manifold portion 145 fluidly connected to the liquid outlet, and a second outlet manifold portion 150 fluidly connected to the liquid outlet. The second plurality of submanifolds 165 can fluidly connect the first outlet manifold 145 portion to the second outlet manifold portion 150.

The heat exchanger 100 can include a plurality of helical gas passageways extending 160 from a first side of the heat exchanger to a second side of the heat exchanger. A first helical gas passageway 160 of the plurality of gas passageways can extend along and around a first outer surface of a first liquid passageway 130 of the plurality of liquid passageways. As shown in FIG. 17, the first helical gas passageway 160 can be bounded at least in part by a first helical fin 160-1 protruding from and extending along and around the first outer surface of the first liquid passageway 130-1 and by a second helical fin 160-2 protruding from and extending along and around the first outer surface of the first liquid passageway. Along at least a portion of the first helical gas passageway 160, the first helical gas passageway can be bounded by a third helical fin 161-3 protruding from and extending along and around a second outer surface of a second liquid passageway 130-2. A first tip 181 of the first helical fin can mate with a third tip 181 of the third helical fin 161-3 along at least a portion of the first helical gas passageway 160. Along at least a portion of the first helical gas passageway 160, the first helical gas passageway can be bounded by a fourth helical fin 160-4 protruding from and extending along and around the second outer surface of the second liquid passageway. A second tip 181 of the second helical fin 161-2 can mate with a fourth tip 181 of the fourth helical fin 161-4 along at least a portion of the first helical gas passageway 160.

Along at least a portion of the first helical gas passageway, the first helical gas passageway 160-1 can be bounded by a fifth helical fin 161-5 protruding from and extending along and around a third outer surface of a third liquid passageway 130-3, as shown in FIG. 21. The second tip 181 of the second helical fin 161-2 can mate with a fifth tip 181 of the fifth helical fin 161-5 along at least a portion of the first helical gas passageway, as shown in FIG. 25. Along at least a portion of the first helical gas passageway 160-1, the first helical gas passageway can be bounded by a sixth helical fin 161-6 protruding from and extending along and around a fourth outer surface of a fourth liquid passageway 130-4. The first tip of the first helical fin 161-1 can mate with a sixth tip of the sixth helical fin 161-6 along at least a portion of the first helical gas passageway 160-1, as shown in FIG. 25. The first helical passageway 160-1 can rotate around the first liquid passageway 0.5-1.0, 0.75-1.5, 1.25-2, 1.5-3, 2-4, or more than 3 times over a length of the first liquid passageway.

During operation or testing, the heat exchanger can exhibit a pressure drop of 1.2 Pa or less when a flow rate of about 122 standard liters per minute of air is delivered to the plurality of helical gas passageways. The heat exchanger can exhibit a pressure drop of 3.8 Pa or less when a flow rate of about 243 standard liters per minute of air is delivered to the plurality of helical gas passageways. The heat exchanger can exhibit a pressure drop of 12 Pa or less when a flow rate of about 486 standard liters per minute of air is delivered to the plurality of helical gas passageways. The heat exchanger can exhibit a pressure drop of 30 Pa or less when a flow rate of about 972 standard liters per minute of air is delivered to the plurality of helical gas passageways.

An additive manufactured polymer heat exchanger 100 can include a first helical gas passageway 160 extending from a first side of the heat exchanger to a second side of the heat exchanger. The first helical gas passageway 160 can extend along and wrap around a first liquid passageway 130 within the heat exchanger. The heat exchanger can include a second helical gas passageway 160 extending from the first side of the heat exchanger to the second side of the heat exchanger. The second helical gas passageway can extend along and wrap around a second liquid passageway 130 within the heat exchanger. As shown in FIGS. 17-25, along a length of the first helical gas passageway, the first helical gas passageway can merge temporarily with the second helical gas passageway within the heat exchanger and then subsequently separate from the second helical gas passageway.

The heat exchanger 100 can include a third helical gas passageway 160 extending from the first side of the heat exchanger to the second side of the heat exchanger. The third helical gas passageway can extend along and wrap around a third liquid passageway 130 within the heat exchanger. As shown in FIGS. 17-25, along the length of the first helical gas passageway 160, the first helical gas passageway can merge temporarily with the third helical gas passageway within the heat exchanger and then subsequently separate from the third helical gas passageway.

The heat exchanger 100 can include a fourth helical gas passageway 160 extending from the first side of the heat exchanger to the second side of the heat exchanger. The fourth helical gas passageway 160 can extend along and wrap around a fourth liquid passageway 130 within the heat exchanger. Along the length of the first helical gas passageway 160, the first helical gas passageway can merge temporarily with the fourth helical gas passageway within the heat exchanger and then subsequently separate from the fourth helical gas passageway.

In some examples, a heat exchanger 100 can include a first helical gas passageway 160 extending from a first side (e.g. 191) of the heat exchanger to a second side (e.g. 190) of the heat exchanger. The first helical gas passageway 160-1 can extend along, wrap around, and be in direct thermal communication with a first liquid passageway 130 within the heat exchanger, as shown in FIGS. 8, 9, 26, 27, 28A, 28B, and 28C. The heat exchanger 100 can include a second helical gas passageway 160-2 extending from the first side of the heat exchanger to the second side of the heat exchanger. The second helical gas passageway 160-2 can extend along, wrap around, and be in direct thermal communication with a second liquid passageway 130 within the heat exchanger. Along a length of the first helical gas passageway 160-1, the first helical gas passageway can merge with (see, e.g. FIG. 17) and then separate from (see, e.g. FIG. 22) the second helical gas passageway 160-2 within the heat exchanger.

The heat exchanger 100 can include a third helical gas passageway 160-3 extending from the first side of the heat exchanger to the second side of the heat exchanger. The third helical gas passageway 160-3 can extend along, wrap around, and be in direct thermal communication with a third liquid passageway 130-3 within the heat exchanger. Along the length of the first helical gas passageway 160-1, the first helical gas passageway can merge with the third helical gas passageway 160-3 (see, e.g. FIG. 18) within the heat exchanger and then separate from the third helical gas passageway further along the length of the first helical gas passageway.

The heat exchanger 100 can include a fourth helical gas passageway 160-4 extending from the first side of the heat exchanger to the second side of the heat exchanger. The fourth helical gas passageway 160-4 can extend along, wrap around, and be in direct thermal communication with a fourth liquid passageway 130-4 within the heat exchanger, as shown in FIG. 23. Along the length of the first helical gas passageway 160-1, the first helical gas passageway can merge with the fourth helical gas passageway 160-4 (see, e.g. FIG. 23) within the heat exchanger and then separate from the fourth helical gas passageway.

The first helical gas passageway 160-1, the second helical gas passageway 160-2, the third helical gas passageway 160-3, and the fourth helical gas passageway 160-4 can be part of a jointless, homogeneous structure, as shown in FIGS. 16-25. The homogeneous structure can have a uniform thermal conductivity to avoid thermal expansion issues. For instance, the heat exchanger 100 can be made of a material having a uniform thermal conductivity of less than 10, 5, 2, or 0.5 W/m-K, such as a polymer.

The heat exchanger 100 can be a liquid-to-gas counter-flow heat exchanger, as shown in FIGS. 10-15. The first helical passageway 160 can wrap around the first liquid passageway 0.5-1.0, 0.75-1.5, 1.25-2, 1.5-3, 2-4, or more than 3 times along a length of the first liquid passageway 130. The helical gas passageway 160 can be configured to convey gas in a flow direction that is opposite from a flow direction of liquid in the liquid passageway 130, as shown in FIGS. 10-15. The first liquid passageway 130 can have a diameter of about 0.02-0.04, 0.03-0.05, 0.04-0.06, 0.05-0.07, or 0.06-0.08 inches. The first liquid passageway 130 can have a wall thickness of about 0.02-0.04, 0.03-0.05, 0.04-0.06, 0.05-0.07, or 0.06-0.08 inches.

In some examples, a heat exchanger 100 can include a dual tapered inlet manifold 105 having a liquid inlet 110 configured to receive a liquid, a first tapered inlet manifold portion 115 fluidly connected to the liquid inlet and tapering in cross-sectional area in a direction away from the liquid inlet, and a second tapered inlet manifold portion 120 fluidly connected to the liquid inlet and tapering in a direction away from the liquid inlet, as shown in FIG. 12. The heat exchanger 100 can include a first plurality of submanifolds 125 fluidly connecting the first tapered inlet manifold portion 115 to the second tapered inlet manifold portion 120. The heat exchanger 100 can include a plurality of liquid passageways 130 fluidly connecting the first plurality of submanifolds 125 to a second plurality of submanifolds 160. The heat exchanger 100 can include a dual tapered outlet manifold 135 having a liquid outlet 140 configured to discharge liquid, a first tapered outlet manifold portion 145 fluidly connected to the liquid outlet and tapering in cross-sectional area in a direction away from the liquid outlet, and a second tapered outlet manifold portion 150 fluidly connected to the liquid outlet and tapering in a direction away from the liquid outlet. The second plurality of submanifolds 160 can fluidly connect the first tapered outlet manifold portion 115 to the second tapered outlet manifold portion 120. The heat exchanger 100 can include a plurality of helical gas passageways 130 extending from a first side (e.g. 191) of the heat exchanger to a second side of the heat exchanger (e.g. 190), as shown in FIGS. 1 and 10. A first helical gas passageway 160 of the plurality of helical gas passageways can extend along and around a first outer surface 132 of a first liquid passageway 130 of the plurality of liquid passageways.

The first helical gas passageway 160 can be bounded at least in part by a first helical fin 161-1 protruding from and extending along and around the first outer surface 132 of the first liquid passageway 130 and by a second helical fin 161-2 protruding from and extending along and around the first outer surface of the first liquid passageway, as shown in FIGS. 17 and 28A. Along at least a portion of the first helical gas passageway 160-1, the first helical gas passageway can be bounded by a third helical fin 161-3 protruding from and extending along and around a second outer surface of a second liquid passageway 130-2, where a first tip of the first helical fin 160-1 mates with a third tip of the third helical fin 160-3 along at least a portion of the first helical gas passageway, as shown in FIG. 17.

Along at least a portion of the first helical gas passageway 160-1, the first helical gas passageway can be bounded by a fourth helical fin 160-4 protruding from and extending along and around the second outer surface of the second liquid passageway 130-2, where a second tip of the second helical fin mates with a fourth tip of the fourth helical fin along at least a portion of the first helical gas passageway, as shown in FIG. 17.

Along at least a portion of the first helical gas passageway 160-1, the first helical gas passageway can be bounded by a fifth helical fin 161-5 protruding from and extending along and around a third outer surface of a third liquid passageway 130-3, where the first tip of the second helical fin 160-2 mates with a fifth tip of the fifth helical fin 161-5 along at least a portion of the first helical gas passageway, as shown in FIG. 25. Along at least a portion of the first helical gas passageway 160-1, the first helical gas passageway can be bounded by a sixth helical fin 161-6 protruding from and extending along and around a fourth outer surface of a fourth liquid passageway 130-4, where the first tip of the first helical fin 161-1 mates with a sixth tip of the sixth helical fin 161-6 along at least a portion of the first helical gas passageway 160-1, as shown in FIG. 25.

The first plurality of submanifolds 125 can each include a first end 126 fluidly connected to the first tapered inlet manifold portion 115, a second end 127 fluidly connected to the second tapered inlet manifold portion 120, and a tapered section 128 located between the first end and the second end, as shown in FIG. 11. The tapered section 128 can neck down to provide a cross-sectional area that is about 10-20, 15-30, or 20-50 percent of the cross-sectional area near the first and second ends of the inlet submanifold 125 to provide uniform flow distribution to the liquid passageways 130. Similarly, the second plurality of submanifolds 165 can each include a first end 166 fluidly connected to the first tapered outlet manifold portion 1140, a second end 167 fluidly connected to the second tapered inlet manifold portion 150, and a tapered section 168 located between the first end and the second end, as shown in FIG. 11. The tapered section 168 can neck down to provide a cross-sectional area that is about 10-20, 15-30, or 20-50 percent of the cross-sectional area near the first and second ends of the outlet submanifold 165.

The first helical gas passageway 160 can be in direct thermal communication with the first liquid passageway 130 and can rotate around the first liquid passageway 0.5-1.0, 0.75-1.5, 1.25-2, 1.5-3, 2-4, or more than 3 times over a length of the first liquid passageway. The first liquid passageway 130 can be made of a material having a thermal conductivity less than 10, 5, 2, or 0.5 W/m-K. The first liquid passageway 130 can have a diameter of about 0.02-0.04, 0.03-0.05, 0.04-0.06, 0.05-0.07, or 0.06-0.08 inches. The heat exchanger 100 can have a density less than about 1.4, 1.3, or 1.2 grams per cubic centimeter and a thermal conductance greater than 2, 3, or 4 W/K. The first helical fin 161-1 can include a turbulence-inducing micro-textured surface comprising micro-sized protrusions extending into the helical gas passageway. Non-limiting examples of surface treatments include micro shot peening, laser treatment, and micro etching. The micro-sized protrusions resulting from the surface treatment can have heights of about 20-50, 40-100, or 75-150 micrometers.

In some examples, a heat exchanger 100 can include an inlet manifold 105 having a liquid inlet 102 configured to receive a liquid, a first inlet manifold portion 115 fluidly connected to the liquid inlet, and a second inlet manifold portion 120 fluidly connected to the liquid inlet, as shown in FIG. 12. The heat exchanger 100 can include a first plurality of submanifolds 125 fluidly connecting the first inlet manifold portion 115 to the second inlet manifold portion 120. The heat exchanger 100 can include a plurality of liquid passageways 130 fluidly connecting the first plurality of submanifolds 125 to a second plurality of submanifolds 165. The heat exchanger 100 can include an outlet manifold 135 having a liquid outlet 140 configured to discharge liquid, a first outlet manifold portion 145 fluidly connected to the liquid outlet, and a second outlet manifold portion 150 fluidly connected to the liquid outlet, where the second plurality of submanifolds 165 fluidly connect the first outlet manifold portion 145 to the second outlet manifold portion 150. The heat exchanger 100 can include a plurality of helical gas passageways 160 extending from a first side of the heat exchanger (e.g. 191) to a second side of the heat exchanger (e.g. 190), as shown in FIG. 1. A first helical gas passageway 160 of the plurality of helical gas passageways can extend along and around a first outer surface of a first liquid passageway 130 of the plurality of liquid passageways and can be in direct thermal communication with the first liquid passageway.

In some examples, a heat exchanger 100 can include a stacked array 180 of interconnected fluid transfer members 175, as shown in FIGS. 10, 31, and 32. The stacked array 180 of fluid transfer members 175 can include a first fluid transfer member 175-1, a second fluid transfer member 175-2, a third fluid transfer member 175-3, and a fourth fluid transfer member 175-4. The first fluid transfer member 175-1 can include a first liquid passageway 130 extending lengthwise though the first fluid transfer member and a first set of four helical fins 161 extending outwardly from an outer surface 132 of the first fluid transfer member and rotating counterclockwise (CCW) along a length 176 of the first fluid transfer member, as shown in FIG. 32. The second fluid transfer member 175-2 can include a second liquid passageway 130 extending lengthwise though the second fluid transfer member and a second set of four helical fins 161 extending outwardly from an outer surface 132 of the second fluid transfer member and rotating clockwise (CW) along a length of the second fluid transfer member. The third fluid transfer member 175-3 can include a third liquid passageway 130 extending lengthwise though the third fluid transfer member and a third set of four helical fins 161 extending outwardly from an outer surface 132 of the third fluid transfer member and rotating clockwise along a length 176 of the third fluid transfer member. The fourth fluid transfer member 175-4 can include a fourth liquid passageway 130 extending lengthwise though the fourth fluid transfer member and a fourth set of four helical fins 161 extending outwardly from an outer surface 132 of the fourth fluid transfer member and rotating counterclockwise along a length 176 of the fourth fluid transfer member. In the stack of interconnected fluid transfer members 180, the first fluid transfer member 175-1 can be adjacent to and interconnected with the second fluid transfer member 175-2 and the fourth fluid transfer member 175-4, the second fluid transfer member 175-2 can be adjacent to and interconnected with the first fluid transfer member 175-1 and the third fluid transfer member 175-3, the third fluid transfer member 175-3 can be adjacent to and interconnected with the second fluid transfer member 175-2 and the fourth fluid transfer member 175-4, and the fourth fluid transfer member 175-4 can be adjacent to and interconnected with the first fluid transfer member 175-1 and the third fluid transfer member 175-3.

The stacked array 180 of interconnected fluid transfer members 175 can form a jointless structure comprising a homogeneous material having a uniform thermal conductivity. The first set of helical fins 161 can rotate around the first fluid transfer member 0.5-1.0, 0.75-1.5, 1.25-2, 1.5-3, 2-4, or more than 3 times along a length of the first fluid transfer member 175-1. The first set of helical fins 161 can at least partially define four helical gas passageways 160 wrapping around and along the outer surface of the first fluid transfer member 175-1.

The heat exchanger 100 can include a first submanifold 125 fluidly connecting an inlet of the first liquid passageway 130-1 to an inlet of the second liquid passageway 130-2, as shown in FIG. 10. The heat exchanger 100 can include a dual tapered inlet manifold 105 having a first tapered inlet manifold portion 115 and a second tapered inlet manifold portion 120, as shown in FIGS. 11-13. The first tapered inlet manifold portion 115 can be fluidly connected to a first end of the first submanifold 125, and the second tapered inlet manifold portion 120 can be fluidly connected to a second end of the first submanifold 125.

Interconnection of the first fluid transfer member 175-1 with the second fluid transfer member 175-2 can include a fin 161-1 of the first set of four helical fins being interconnected to a fin 161-3 of the second set of four helical fins along a portion of the first fin, as shown in FIG. 17. At a region of interconnection, the fin 161-1 of the first set of four helical fins and the fin 161-3 of the second set of four helical fins may have a jointless union formed by additive manufacturing.

The heat exchanger 100 can include a set of four helical grooves 162 in the outer surface 132 of the fluid transfer member 175-1 and rotating counterclockwise along a length 176 of the first fluid transfer member, as shown in FIGS. 26 and 28B. The heat exchanger 100 can be made of a material having a thermal conductivity less than 10, 5, 2, or 0.5 W/m-K to limit axial conduction and improve performance. The heat exchanger can have a thermal conductance greater than 2, 3, or 4 W/K. The first liquid passageway 130 can have a diameter of about 0.02-0.04, 0.03-0.05, 0.04-0.06, 0.05-0.07, or 0.06-0.08 inches. The heat exchanger 100 can have a density less than about 1.4, 1.3, or 1.2 grams per cubic centimeter.

In some examples, a heat exchanger 100 can include an inlet manifold 105 having a liquid inlet 110 configured to receive a liquid, a first inlet manifold portion 115 fluidly connected to the liquid inlet, and a second inlet manifold portion 120 fluidly connected to the liquid inlet. The heat exchanger 100 can include a first plurality of submanifolds 125 fluidly connecting the first inlet manifold portion 115 to the second inlet manifold portion 120. The heat exchanger 100 can include a plurality of interconnected fluid transfer members 175 forming a stacked array 180 of interconnected fluid transfer members 175. Each fluid transfer member 175 can have a liquid passageway 130 extending lengthwise through an inner region of the fluid transfer member to form a plurality of liquid passageways. Each fluid transfer member can include at least four helical fins 161 extending outward from and along an outer surface 132 of the fluid transfer member 175. The heat exchanger can include an outlet manifold 135 having a liquid outlet 140 configured to discharge liquid, a first outlet manifold portion 145 fluidly connected to the liquid outlet, and a second outlet manifold portion 150 fluidly connected to the liquid outlet. The heat exchanger 100 can include a second plurality of submanifolds 165 fluidly connecting the first outlet manifold portion 145 to the second outlet manifold portion 150. The plurality of liquid passageways 130 can fluidly connect the first plurality of submanifolds 125 to the second plurality of manifolds 160. The stacked array 180 of interconnected fluid transfer members 175 can form a jointless structure made of a homogeneous material having a uniform thermal conductivity, which can avoid thermal expansion issues that could result in leakage in other heat exchangers over time, such as the reference heat exchanger.

The heat exchanger 100 can include a plurality of helical gas passageways 160 extending from a first side of the heat exchanger (e.g. 191) to a second side of the heat exchanger (e.g. 190), as shown in FIGS. 1-7. A first helical gas passageway 160 of the plurality of gas passageways can extend along and around a first outer surface 132 of a first liquid passageway 130 of the plurality of liquid passageways. As shown in FIG. 17, the first helical gas passageway 160-1 can be bounded at least in part by a first helical fin 161-1 protruding from and extending along and around first outer surface 132 of the first liquid passageway and by a second helical fin 161-2 protruding from and extending along and around the first outer surface of the first liquid passageway. Along at least a portion of the first helical gas passageway 160-1, the first helical gas passageway can also be bounded by a third helical fin 160-3 protruding from and extending along and around a second outer surface of a second liquid passageway 130-2, as shown in FIG. 17. A first tip of the first helical fin 161-1 can mate with a third tip of the third helical fin 161-3 along at least a portion of the first helical gas passageway 160-1. Along at least a portion of the first helical gas passageway 160-1, the first helical gas passageway can be bounded by a fourth helical fin 160-4 protruding from and extending along and around the second outer surface of the second liquid passageway 130-2, as shown in FIG. 17. A second tip of the second helical fin 161-2 can mate with a fourth tip of the fourth helical fin 161-4 along at least a portion of the first helical gas passageway 160-1.

The first helical passageway 160-1 can rotate around the first liquid passageway 0.5-1.0, 0.75-1.5, 1.25-2, 1.5-3, 2-4, or more than 3 times along a length 176 of the first liquid passageway 130-1. The heat exchanger 100 can include a material having a thermal conductivity less than 10, 5, 2, or 0.5 W/m-K and a thermal conductance greater than 2, 3, or 4 W/K. The first liquid passageway 130-1 can have a diameter of about 0.02-0.04, 0.03-0.05, 0.04-0.06, 0.05-0.07, or 0.06-0.08 inches. The heat exchanger 100 can have a density less than 1.4, 1.3, or 1.2 grams per cubic centimeter.

In some examples, a heat exchanger 100 can include a stacked array 180 of interconnected fluid transfer members 175 having a first fluid transfer member 175-1, a second fluid transfer member 175-2, a third fluid transfer member 175-3, and a fourth fluid transfer member 175-4, as shown in FIG. 31. The first fluid transfer member 175-1 can include a first set of two or more liquid passageways 130 (see, e.g. FIG. 32) extending lengthwise though the first fluid transfer member 175-1 and a first set of helical fins 161 extending outwardly from an outer surface 132 of the first fluid transfer member and rotating clockwise along a length 176 of the first fluid transfer member. The second fluid transfer member 175-2 can include a second set of two or more liquid passageways 130 extending lengthwise though the second fluid transfer member and a second set of helical fins 161 extending outwardly from an outer surface 132 of the second fluid transfer member and rotating counterclockwise along a length 176 of the second fluid transfer member. The third fluid transfer member 175-3 can include a third set of two or more liquid passageways 130 extending lengthwise though the third fluid transfer member and a third set of helical fins 161 extending outwardly from an outer surface 132 of the third fluid transfer member and rotating counterclockwise along a length 176 of the third fluid transfer member. The fourth fluid transfer member 175-4 can include a fourth set of two or more liquid passageways 130 extending lengthwise though the fourth fluid transfer member and a fourth set of helical fins 161 extending outwardly from an outer surface 132 of the fourth fluid transfer member and rotating clockwise along a length 176 of the fourth fluid transfer member. In the stack of interconnected fluid transfer members 180, the first fluid transfer member 175-1 can be adjacent to and interconnected with the second fluid transfer member 175-2 and the fourth fluid transfer member 175-4, the second fluid transfer member 175-2 can be adjacent to and interconnected with the first fluid transfer member 175-1 and the third fluid transfer member 175-3, the third fluid transfer member 175-3 can be adjacent to and interconnected with the second fluid transfer member 175-2 and the fourth fluid transfer member 175-4, and the fourth fluid transfer member 175-4 can be adjacent to and interconnected with the first fluid transfer member 175-1 and the third fluid transfer member 175-3.

The elements and method steps described herein can be used in any combination whether explicitly described or not. All combinations of method steps as described herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

The methods and compositions of the present invention can comprise, consist of, or consist essentially of the essential elements and limitations described herein, as well as any additional or optional steps, components, or limitations described herein or otherwise useful in the art.

It is understood that the invention is not confined to the particular construction and arrangement of parts herein illustrated and described, but embraces such modified forms thereof as come within the scope of the claims.

The foregoing description has been presented for purposes of illustration and description. It is not intended to be exhaustive or to limit the claims to the embodiments disclosed. Other modifications and variations may be possible in view of the above teachings. The embodiments were chosen and described to explain the principles of the invention and its practical application to enable others skilled in the art to best utilize the invention in various embodiments and various modifications as are suited to the particular use contemplated. It is intended that the claims be construed to include other alternative embodiments of the invention except insofar as limited by the prior art.

What is claimed is:

1. A heat exchanger comprising:
   an inlet manifold comprising: a liquid inlet configured to receive a liquid, a first inlet manifold portion fluidly connected to the liquid inlet, and a second inlet manifold portion fluidly connected to the liquid inlet;
   a first plurality of submanifolds fluidly connecting the first inlet manifold portion to the second inlet manifold portion;
   a plurality of interconnected fluid transfer members forming a stacked array of interconnected fluid transfer members, each fluid transfer member comprising a liquid passageway extending lengthwise through an inner region of the fluid transfer member to form a plurality of liquid passageways, each fluid transfer member comprising at least four helical fins extending outward from and along an outer surface of the fluid transfer member;
   an outlet manifold comprising: a liquid outlet configured to discharge the liquid, a first outlet manifold portion fluidly connected to the liquid outlet, and a second outlet manifold portion fluidly connected to the liquid outlet;
   a second plurality of submanifolds fluidly connecting the first outlet manifold portion to the second outlet manifold portion, wherein the plurality of liquid passageways fluidly connect the first plurality of submanifolds to the second plurality of manifolds; and
   a plurality of helical gas passageways extending from a first side of the heat exchanger to a second side of the heat exchanger, wherein a first helical gas passageway of the plurality of gas passageways extends along and around a first outer surface of a first liquid passageway of the plurality of liquid passageways, wherein the first helical gas passageway is bounded at least in part by a first helical fin protruding from and extending along and around the first outer surface of the first liquid passageway and by a second helical fin protruding from and extending along and around the first outer surface of the first liquid passageway;

wherein along at least a portion of the first helical gas passageway, the first helical gas passageway is also bounded by a third helical fin protruding from and extending along and around a second outer surface of a second liquid passageway, wherein a first tip of the first helical fin mates with a third tip of the third helical fin along at least a portion of the first helical gas passageway.

2. The heat exchanger of claim 1, wherein the stacked array of interconnected fluid transfer members forms a jointless structure comprising a homogeneous material having a uniform thermal conductivity.

3. The heat exchanger of claim 1, wherein along at least a portion of the first helical gas passageway, the first helical gas passageway is bounded by a fourth helical fin protruding from and extending along and around the second outer surface of the second liquid passageway, wherein a second tip of the second helical fin mates with a fourth tip of the fourth helical fin along at least a portion of the first helical gas passageway.

4. The heat exchanger of claim 1, wherein the first helical gas passageway rotates around the first liquid passageway 0.5-1.0, 0.75-1.5, 1.25-2, 1.5-3, 2-4, or more than 3 times along a length of the first liquid passageway.

5. The heat exchanger of claim 1, wherein the heat exchanger comprises a material having a thermal conductivity less than 10, 5, 2, or 0.5 W/m-K.

6. The heat exchanger of claim 1, wherein the first liquid passageway has a diameter of about 0.02-0.04, 0.03-0.05, 0.04-0.06, 0.05-0.07, or 0.06-0.08 inches.

7. The heat exchanger of claim 1, wherein the heat exchanger has a density less than 1.4, 1.3, or 1.2 grams per cubic centimeter.

8. The heat exchanger of claim 1, wherein the heat exchanger is 3D-printed using a printable material such as a polymer, polymer-ceramic composite, polymer-metal composite, carbon composite, carbon nanotubes, graphene, metal composite, metal alloy, or metal.

9. The heat exchanger of claim 1, wherein at least one of the fluid transfer members has a width of 4-8 mm, a height of 4-8 mm, and a length of 25-35 mm.

10. The heat exchanger of claim 1, wherein the first liquid passageway has a cross-sectional area of 0.0003-0.002, 0.001-0.003, 0.002-0.005, or greater than 0.005 square inches.

11. The heat exchanger of claim 1, wherein the heat exchanger comprises a polymer with a thermal conductivity less than 50, 10, 5, 2, or 0.5 W/m-K.

12. The heat exchanger of claim 1, wherein the heat exchanger has a mass less than 75, 85, or 100 grams.

13. The heat exchanger of claim 1, wherein the first liquid passageway has a wall thickness of 0.02-0.04, 0.03-0.05, 0.04-0.06, 0.05-0.07, or 0.06-0.08 inches.

14. The heat exchanger of claim 1, wherein the heat exchanger comprises a material having a thermal conductance greater than 2, 3, or 4 W/K.

15. The heat exchanger of claim 1, wherein at least one of the four helical fins comprises protrusions with a height of 20-50, 40-100, or 75-150 micrometers.

* * * * *